United States Patent
Zimmerman et al.

(10) Patent No.: US 11,165,142 B2
(45) Date of Patent: Nov. 2, 2021

(54) SYSTEM AND APPARATUS FOR DRIVING ANTENNA

(71) Applicant: Viasat, Inc., Carlsbad, CA (US)

(72) Inventors: Kurt A. Zimmerman, Dunwoody, GA (US); Kevin M. Skinner, Gainesville, GA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 17/013,058

(22) Filed: Sep. 4, 2020

(65) Prior Publication Data

US 2020/0398266 A1 Dec. 24, 2020

Related U.S. Application Data

(63) Continuation-in-part of application No. 16/736,957, filed on Jan. 8, 2020, now Pat. No. 10,985,449, which
(Continued)

(51) Int. Cl.
*H01Q 1/14* (2006.01)
*H01Q 1/28* (2006.01)
(Continued)

(52) U.S. Cl.
CPC .............. *H01Q 1/288* (2013.01); *B01L 3/021* (2013.01); *B01L 3/0227* (2013.01);
(Continued)

(58) Field of Classification Search
CPC .......... H01Q 1/288; H01Q 1/125; H01Q 1/18; H01Q 3/08; H01Q 21/28; H04B 7/18515;
(Continued)

(56) References Cited

U.S. PATENT DOCUMENTS 4,134,307 A 1/1979 Nilsson
4,456,988 A * 6/1984 Nakagome ........... H04B 7/2046
370/323
(Continued)

FOREIGN PATENT DOCUMENTS

WO WO2007/066885 A1 6/2007
WO WO2015/200860 A1 12/2015

OTHER PUBLICATIONS

ISA/EPO, International Search Report and Written Opinion, International App. No. PCT/US2015/038121, 11 pgs.
(Continued)

*Primary Examiner* — Hai V Nguyen
(74) *Attorney, Agent, or Firm* — Holland & Hart LLP

(57) ABSTRACT

Techniques for antenna positioning system having a drive element shared by multiple antennas for positioning about a positioning degree of freedom are described. In some examples, each antenna can be coupled with a rotating spindle, with each antenna spindle being coupled with the shared drive element. By driving a shared drive element, each of the antenna spindles in the system can be rotated via the associated coupling. In some examples, such a coupling may include link arms with an adjustable length to reduce backlash or to apply a preload to the system. In some examples, such a coupling may be configured to position multiple antennas over different orientation ranges in response to the drive element driving over an actuation range, which may include one antenna being idled or otherwise maintained at an orientation while another antenna is driven, or may include different antennas being driven according to different actuation ratios.

29 Claims, 15 Drawing Sheets

Related U.S. Application Data is a continuation of application No. 16/164,152, filed on Oct. 18, 2018, now abandoned, which is a continuation of application No. 15/582,398, filed on Apr. 28, 2017, now Pat. No. 10,135,127, which is a continuation of application No. 14/752,232, filed on Jun. 26, 2015, now Pat. No. 9,680,199.

(60) Provisional application No. 62/018,376, filed on Jun. 27, 2014.

(51) Int. Cl.
| | |
|---|---|
| *F16H 21/14* | (2006.01) |
| *H01Q 3/08* | (2006.01) |
| *H01Q 21/28* | (2006.01) |
| *B01L 3/02* | (2006.01) |
| *G01N 1/14* | (2006.01) |
| *H01Q 1/12* | (2006.01) |
| *H01Q 1/18* | (2006.01) |
| *H04B 7/185* | (2006.01) |

(52) U.S. Cl.
CPC ........... *B01L 3/0237* (2013.01); *B01L 3/0286* (2013.01); *F16H 21/14* (2013.01); *G01N 1/14* (2013.01); *H01Q 1/125* (2013.01); *H01Q 1/18* (2013.01); *H01Q 3/08* (2013.01); *H01Q 21/28* (2013.01); *H04B 7/18515* (2013.01); *H04B 7/18519* (2013.01); *B01L 2200/087* (2013.01); *B01L 2200/143* (2013.01); *B01L 2300/024* (2013.01); *B01L 2300/027* (2013.01); *H04B 7/18508* (2013.01)

(58) Field of Classification Search
CPC . H04B 7/18519; H04B 7/18508; B01L 3/021; B01L 3/0227; B01L 3/0237; B01L 3/0286; B01L 2200/087; B01L 2200/143; B01L 2300/024; B01L 2300/027; F16H 21/14; G01N 1/14
USPC .............................. 73/864.13; 455/12.1, 13.2
See application file for complete search history.

(56) References Cited

U.S. PATENT DOCUMENTS

| | | | | |
|---|---|---|---|---|
| 4,947,451 A * | 8/1990 | Nawata | ............... | H04B 7/18523 370/221 |
| 5,327,572 A * | 7/1994 | Freeburg | ............ | H04B 7/18521 455/430 |
| 5,394,561 A * | 2/1995 | Freeburg | ............ | H04B 7/18513 455/428 |
| 5,508,712 A | 4/1996 | Tom et al. | | |
| 5,555,257 A * | 9/1996 | Dent | ...................... | H01Q 1/246 342/352 |
| 5,594,941 A * | 1/1997 | Dent | ...................... | H01Q 1/246 370/310 |
| 5,619,503 A * | 4/1997 | Dent | ...................... | H01Q 1/246 370/330 |
| 5,764,199 A * | 6/1998 | Ricardi | .................. | H01Q 15/08 343/753 |
| 5,781,163 A * | 7/1998 | Ricardi | .................. | H01Q 15/08 343/754 |
| 5,864,321 A | 1/1999 | Paul et al. | | |
| 5,909,564 A * | 6/1999 | Alexander | ............ | H04L 49/351 710/316 |
| 5,952,980 A | 9/1999 | Boling | | |
| 6,018,659 A * | 1/2000 | Ayyagari | ........... | H04B 7/18504 342/450 |
| 6,052,560 A | 4/2000 | Karabinis | | |
| 6,163,539 A * | 12/2000 | Alexander | ............... | H04L 12/56 370/389 |
| 6,191,734 B1 * | 2/2001 | Park | ........................ | H01Q 3/06 342/359 |
| 6,195,060 B1 * | 2/2001 | Spano | ..................... | H01Q 1/28 248/183.1 |
| 6,204,823 B1 * | 3/2001 | Spano | ................... | H01Q 1/125 343/705 |
| 6,310,582 B1 | 10/2001 | Uetake et al. | | |
| 6,403,125 B1 | 6/2002 | Pauly et al. | | |
| 6,486,845 B2 * | 11/2002 | Ogawa | ..................... | H01Q 1/42 343/757 |
| 6,661,388 B2 | 12/2003 | Desargant et al. | | |
| 6,670,317 B2 | 12/2003 | Severns et al. | | |
| 6,700,527 B1 * | 3/2004 | Martin | ..................... | G01S 7/41 342/25 R |
| 6,738,024 B2 * | 5/2004 | Butler | ..................... | H01Q 1/28 343/757 |
| 6,741,573 B1 | 5/2004 | Asaeda et al. | | |
| 6,812,904 B2 * | 11/2004 | Tietjen | .................... | H01Q 3/08 343/757 |
| 6,822,612 B2 * | 11/2004 | Takimoto | ................. | H01Q 3/14 343/713 |
| 6,839,039 B2 * | 1/2005 | Tanaka | ..................... | H01P 3/10 343/757 |
| 6,839,558 B2 * | 1/2005 | Namura | ................. | H04W 24/04 455/423 |
| 6,882,321 B2 * | 4/2005 | Tietjen | .................... | H01Q 3/08 343/757 |
| 6,911,950 B2 * | 6/2005 | Harron | .................... | H01Q 3/08 343/765 |
| 6,917,784 B2 * | 7/2005 | Martin | ............... | G01S 13/9058 455/3.02 |
| 6,952,587 B2 * | 10/2005 | Whikehart | ........... | H04W 64/00 455/19 |
| 6,999,036 B2 * | 2/2006 | Stoyanov | ............. | H01Q 1/1264 343/757 |
| 7,123,876 B2 | 10/2006 | Wang et al. | | |
| 7,183,989 B2 * | 2/2007 | Tietjen | .................... | H01Q 25/002 343/757 |
| 7,183,996 B2 * | 2/2007 | Wensink | ................ | H01Q 1/125 343/882 |
| 7,199,764 B2 * | 4/2007 | Tietjen | .................... | H01Q 3/26 343/757 |
| 7,245,262 B2 * | 7/2007 | Kim | ....................... | H01Q 1/246 343/757 |
| 7,256,748 B2 * | 8/2007 | Tietjen | .................... | H01Q 3/08 343/763 |
| 7,385,562 B2 * | 6/2008 | Stoyanov | ............. | H01Q 1/1264 343/757 |
| 7,388,562 B2 * | 6/2008 | Koyama | ............... | G09G 3/3233 345/76 |
| 7,394,779 B2 | 7/2008 | Seo et al. | | |
| 7,492,322 B2 * | 2/2009 | Jung | .................... | H01Q 1/3275 343/757 |
| 7,595,762 B2 * | 9/2009 | Mansour | ............... | H01Q 1/3283 343/757 |
| 7,616,165 B2 * | 11/2009 | Tammisetti | .............. | H01Q 3/04 343/776 |
| 7,629,935 B2 * | 12/2009 | Mansour | .................. | H01Q 3/04 343/757 |
| 7,663,566 B2 * | 2/2010 | Engel | ................... | H01Q 21/064 343/772 |
| 7,710,337 B2 * | 5/2010 | Blalock | .................... | H01Q 3/02 343/757 |
| 7,768,469 B2 * | 8/2010 | Mansour | .................. | H01Q 3/04 343/757 |
| 7,893,885 B2 * | 2/2011 | Jung | ....................... | H01Q 3/08 343/765 |
| 7,911,400 B2 * | 3/2011 | Kaplan | .................... | H01Q 3/08 343/713 |
| 7,969,375 B2 * | 6/2011 | Blalock | .................. | H01Q 1/125 343/763 |
| 7,999,750 B2 * | 8/2011 | Mansour | .................. | H01Q 3/04 343/757 |
| 8,013,798 B2 * | 9/2011 | Blalock | ................... | H02K 41/031 343/757 |

(56) References Cited

U.S. PATENT DOCUMENTS

| | | | |
|---|---|---|---|
| 8,054,233 B2* | 11/2011 | Holt | H01Q 3/08 343/763 |
| 8,085,211 B2* | 12/2011 | Yang | F16H 1/227 343/766 |
| 8,120,541 B2* | 2/2012 | Jung | H01Q 3/08 343/766 |
| 8,140,200 B2* | 3/2012 | Heppe | B64D 47/08 701/16 |
| 8,178,246 B2 | 5/2012 | Shima | |
| 8,638,264 B2* | 1/2014 | Hall | H01Q 3/08 343/766 |
| 8,761,663 B2* | 6/2014 | Kaplan | H01Q 3/04 455/12.1 |
| 8,964,891 B2* | 2/2015 | Tsofe | H04B 17/12 375/296 |
| 9,016,631 B2* | 4/2015 | Parsley | B64C 1/1446 244/129.5 |
| 9,093,742 B2* | 7/2015 | Choiniere | H01Q 3/08 |
| 9,240,314 B2* | 1/2016 | Kurokawa | H01L 21/67109 |
| 9,263,797 B1* | 2/2016 | Hall | H01Q 1/125 |
| 9,444,149 B2* | 9/2016 | Cha | H01P 1/165 |
| 9,553,657 B2* | 1/2017 | Cordone | H01Q 1/27 |
| 9,583,829 B2* | 2/2017 | Engel | H01Q 3/08 |
| 9,590,299 B2* | 3/2017 | Rao | H01Q 19/132 |
| 9,647,748 B1* | 5/2017 | Mitchell | H04B 7/18508 |
| 9,680,199 B2* | 6/2017 | Newkirk | B01L 3/021 |
| 9,686,027 B2* | 6/2017 | Yeshanov | H04B 17/40 |
| 9,711,850 B2* | 7/2017 | Naym | H01Q 1/125 |
| 9,882,276 B1* | 1/2018 | Hall | H01Q 3/02 |
| 9,917,362 B2* | 3/2018 | Zimmerman | H01Q 1/42 |
| 10,079,424 B2* | 9/2018 | Oxford | H01Q 1/1257 |
| 10,135,127 B2* | 11/2018 | Newkirk | B01L 3/021 |
| 10,278,203 B2 | 4/2019 | Johnson et al. | |
| 10,559,875 B2* | 2/2020 | Newkirk | H04B 7/18519 |
| 10,985,449 B2* | 4/2021 | Newkirk | H04B 7/18515 |
| 2002/0011958 A1 | 1/2002 | Ogawa et al. | |
| 2006/0132372 A1* | 6/2006 | Jung | H01Q 3/08 343/766 |
| 2006/0197713 A1* | 9/2006 | Mansour | H01Q 21/29 343/882 |
| 2006/0244669 A1* | 11/2006 | Mansour | H01Q 3/04 343/757 |
| 2008/0297426 A1* | 12/2008 | Jung | H01Q 3/08 343/765 |
| 2009/0121932 A1 | 5/2009 | Whitehead et al. | |
| 2009/0216394 A1* | 8/2009 | Heppe | B64C 39/024 701/16 |
| 2010/0265878 A1 | 10/2010 | Foxworthy et al. | |
| 2013/0342390 A1* | 12/2013 | Cha | H01Q 19/195 342/352 |
| 2014/0104125 A1* | 4/2014 | Choiniere | H01Q 3/18 343/761 |
| 2014/0225768 A1* | 8/2014 | Engel | H04B 7/18508 342/354 |
| 2015/0380802 A1* | 12/2015 | Newkirk | H04B 7/18519 343/879 |
| 2016/0372835 A1* | 12/2016 | Toso | H01Q 19/192 |
| 2017/0077585 A1* | 3/2017 | Oxford | H01Q 3/06 |
| 2017/0085315 A1* | 3/2017 | Atkinson | G06Q 10/0833 |
| 2017/0237155 A1* | 8/2017 | Newkirk | B01L 3/0286 455/9 |
| 2017/0358851 A1* | 12/2017 | Diamond | H01Q 21/06 |
| 2018/0198188 A1* | 7/2018 | Bensen | H01Q 3/08 |
| 2019/0020094 A1* | 1/2019 | Oxford | H01Q 3/06 |
| 2019/0051991 A1* | 2/2019 | Patel | H01Q 3/18 |
| 2019/0157749 A1* | 5/2019 | Newkirk | H01Q 1/288 |
| 2020/0215530 A1* | 7/2020 | Newkirk | H04B 7/18515 |
| 2020/0259250 A1* | 8/2020 | Diamond | H01Q 3/08 |
| 2021/0167847 A1* | 6/2021 | Jin | H04B 7/1851 |

OTHER PUBLICATIONS

ISA/EPO—WO/ISA for International Appl. No. PCTUS2015038121, 8 pgs.

* cited by examiner

SYSTEM AND APPARATUS FOR DRIVING ANTENNA

CROSS REFERENCES

The present Application for Patent is a continuation in part of U.S. patent application Ser. No. 16/736,957 by Newkirk et al., entitled "System and Apparatus for Driving Antenna," filed Jan. 8, 2020, which is a continuation of U.S. patent application Ser. No. 16/164,512 by Newkirk et al., entitled "System and Apparatus For Driving Antenna" filed Oct. 18, 2018, which is a continuation of U.S. patent application Ser. No. 15/582,398 by Newkirk et al., entitled "System and Apparatus for Driving Antenna" filed Apr. 28, 2017, which is a continuation of U.S. patent application Ser. No. 14/752,232 by Newkirk et al., entitled "Systems and Apparatus for Driving Antenna," filed Jun. 26, 2015, which claims priority to U.S. Provisional Patent Application No. 62/018,376 by Newkirk et al., entitled "System and Apparatus for Driving Antenna," filed Jun. 27, 2014, each of which is assigned to the assignee hereof and each of which is expressly incorporated by reference in its entirety herein.

BACKGROUND

Antenna systems can include multiple antennas in order to provide operation at multiple frequency bands. For example, in mobile applications where a user moves between coverage areas of different satellites operating at different frequency bands, each of the antennas may be used to individually communicate with one of the satellites. However, in some applications such as on an airplane, performance requirements and constraints such as size, cost and/or weight, may preclude the use of multiple antennas.

SUMMARY

Methods, systems, and devices are described for driving multiple antennas in a multiple antenna system. The multiple antenna system can include two or more antennas, each rotating on their own antenna spindle, with their positioning provided by a multiple-antenna positioner. The multiple-antenna positioner can be controlled in a first mode where a first antenna is positioned in order to establish and/or maintain a communications link with a satellite. In the first mode, a second antenna in the multiple antenna system may be in an inactive state or idle without maintaining a communications link. The multiple-antenna positioner can alternatively be controlled in a second mode where the second antenna is positioned in order to establish and/or maintain a communications link with a satellite, which may or may not be the same satellite involved in the communications link of the first mode. In the second mode, the first antenna may be in an inactive state, without maintaining a communications link.

In some examples, an antenna spindle may be coupled with a drive spindle by a pair of link arms, such that rotation of the drive spindle simultaneously rotates the associated antenna spindle. In a multiple-antenna positioner, two such antenna spindles may be rotated by a rotation of the drive spindle, thereby providing positioning of two antennas using a single drive element. In some examples, the link arms can be adjusted in a manner that reduces a degree of backlash, such as an adjustment via a turnbuckle. By reducing the degree of backlash, the accuracy and responsiveness of the positioning of the multiple antennas can be improved. Reducing a degree of backlash can additionally include a mechanical or compliant preload of the system, where various components of the antenna system can be under a static tensile or compressive load. A preload can help to limit a degree of backlash over time, by compensating for wear of various components of the multiple antenna system.

In some examples, a multiple-antenna positioner may include a mechanism that, in response to driving a drive element, rotates different antenna spindles over different positioning or orientation ranges. For example, when such a mechanism is configured for elevation positioning, in response to driving a single drive element over an actuation range, the mechanism may be configured to position a first antenna over a first elevation range, and position a second antenna over a second elevation range that is different than the first elevation range. In some examples, such a mechanism may support actuating different antennas according to different ranges of a drive element, which may include a range of the drive element where one antenna is mechanically idled or generally maintained in a fixed position (e.g., according to a travel stop) while another antenna is driven by the single drive element. In some examples, such a mechanism may support actuating different antennas using different actuation ratios (e.g., different gear ratios, different kinematic ratios) between a common drive element and each of the antennas.

In various examples, a multiple antenna positioner in accordance with the techniques described herein may support a reduction in size, cost, and/or weight in comparison to a system that has a unique positioner for each antenna, while also supporting suitable stiffness and/or drive efficiency for providing positioning of each of the associated antennas.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of various aspects of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
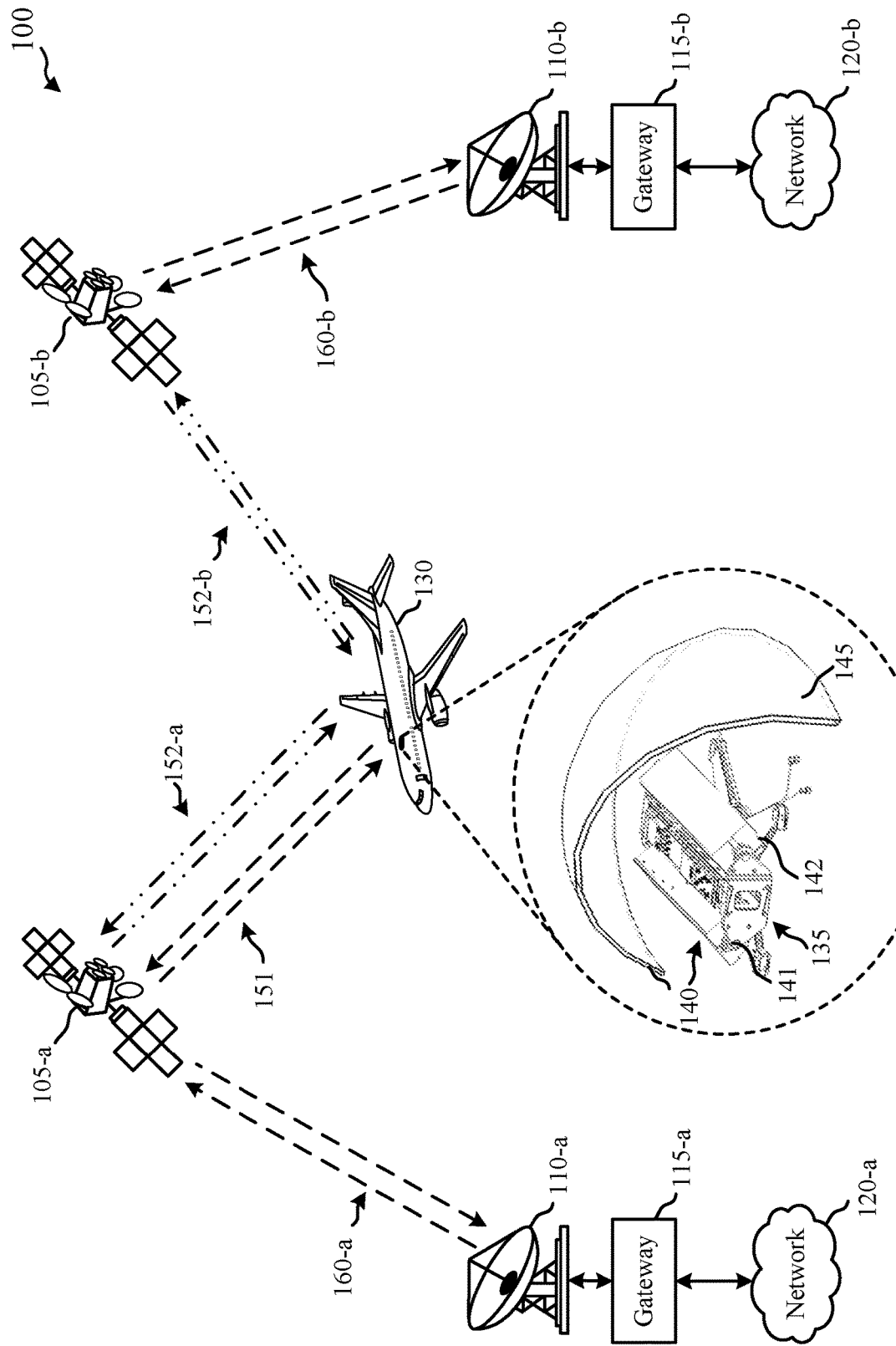
FIG. 1 shows a diagram of a satellite communication system in accordance with various aspects of the present disclosure.

The described features generally relate to a multiple antenna system, and particularly a multiple-antenna positioner. In a multiple-antenna positioner, each antenna may be coupled with a rotating spindle, which may each be coupled with a single drive element. In some examples, such coupling may be provided by a respective pair of link arms that couple the spindles such that a rotation of the single drive spindle can provide a rotation of each of the antenna spindles. The link arms may have a fixed length, or may alternatively have a variable length by way of various mechanisms such as a turnbuckle. With a variable length, the link arms may be adjusted in length to reduce a degree of backlash in the system, where the backlash may be the result of gaps between various coupled components of the multiple-antenna positioner. Reducing the degree of backlash may further include applying a preload to the system, which can maintain the reduction in backlash over time by compensating for mechanical wear of various components. By reducing backlash in the multiple-antenna positioner, the multiple-antenna positioning system can have a favorable degree of stiffness, such that the positioning of each of the antennas can be more responsive to a rotation of the drive spindle, and can also be more stable when the drive spindle is held in a fixed position.

In some examples, a multiple-antenna positioner may include a mechanism that, in response to driving a single drive element, rotates multiple antenna spindles over different positioning ranges (e.g., different orientations of the respective antennas or boresights thereof). For example, when such a mechanism is configured for elevation positioning, in response to driving a drive element over an actuation range, the mechanism may be configured to position a first antenna over a first elevation range, and position a second antenna over a second elevation range that is different than (e.g., wider than, narrower than, over a different angular range than) the first elevation range. In some examples, such a mechanism may support actuating different antennas using different ranges of a drive element, which may include one antenna being idled or generally maintained in a fixed position (e.g., according to a spring or other preload into a travel stop, according to a clutch mechanism being disengaged) while another antenna is being driven by the drive element. Additionally or alternatively, in some examples, such a mechanism may support actuating different antennas using different actuation ratios (e.g., different gear ratios, different kinematic ratios) between a common drive element and each of the antennas.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communication system 100 in accordance with various aspects of the present disclosure. The satellite communication system 100 includes a first satellite 105-a, a first gateway 115-a, a first gateway antenna system 110-a, and an aircraft 130. The first gateway 115-a communicates with at least a first network 120-a. In operation, the satellite communication system 100 can provide for one-way or two-way communications between the aircraft 130 and the first network 120-a through at least the first satellite 105-a and the first gateway 115-a.

In some examples, the satellite communications system includes a second satellite 105-b, a second gateway 115-b, and a second gateway antenna system 110-b. The second gateway 115-b may communicate with at least a second network 120-b. In operation, the satellite communication system 100 can provide for one-way or two-way communications between the aircraft 130 and the second network 120-b through at least the second satellite 105-b and the second gateway 115-b.

The first satellite 105-a and the second satellite 105-b may be any suitable type of communication satellite. In some examples, at least one of the first satellite 105-a and the second satellite 105-b may be in a geostationary orbit. In other examples, any appropriate orbit (e.g., low earth orbit (LEO), medium earth orbit (MEO), etc.) for the first satellite 105-a and/or the second satellite 105-b may be used. The first satellite 105-a and/or the second satellite 105-b may be a multi-beam satellite configured to provide service for multiple service beam coverage areas in a predefined geographical service area. In some examples, the first satellite 105-a and the second satellite 105-b may provide service in non-overlapping coverage areas, partially-overlapping coverage areas, or fully-overlapping coverage areas. In some examples, the satellite communication system 100 includes more than two satellites 105.

The first gateway antenna system 110-a may be one-way or two-way capable and designed with adequate transmit power and receive sensitivity to communicate reliably with the first satellite 105-a. The first satellite 105-a may communicate with the first gateway antenna system 110-a by sending and receiving signals through one or more beams 160-a. The first gateway 115-a sends and receives signals to and from the first satellite 105-a using the first gateway antenna system 110-a. The first gateway 115-a is connected to the first network 120-a. The first network 120-a may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

Examples of satellite communication system 100 may include the second satellite 105-*b*, along with either unique or shared associated system components. For example, the second gateway antenna system 110-*b* may be one-way or two-way capable and designed with adequate transmit power and receive sensitivity to communicate reliably with the second satellite 105-*b*. The second satellite 105-*b* may communicate with the second gateway antenna system 110-*b* by sending and receiving signals through one or more beams 160-*b*. The second gateway 115-*b* sends and receives signals to and from the second satellite 105-*b* using the second gateway antenna system 110-*b*. The second gateway 115-*b* is connected to the second network 120-*b*. The second network 120-*b* may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

In various examples, the first network 120-*a* and the second network 120-*b* may be different networks, or the same network 120. In various examples, the first gateway 115-*a* and the second gateway 115-*b* may be different gateways, or the same gateway 115. In various examples, the first gateway antenna system 110-*a* and the second gateway antenna system 110-*b* may be different gateway antenna systems, or the same gateway antenna system 110.

The aircraft 130 can employ a communication system including a multiple antenna system 140. The multiple antenna system 140 can include, for instance a first antenna 141 and a second antenna 142. In some examples, the first antenna 141 and/or the second antenna 142 can be a dual polarized planar horn antenna array. Alternatively, the first antenna 141 and/or the second antenna 142 can be a different type of antenna. The multiple antenna system 140 can be mounted on the outside of the fuselage of the aircraft 130 under a radome 145. The multiple antenna system 140 may be mounted to an antenna assembly positioning system 135 used to point either the first antenna 141, or the second antenna 142 to a satellite 105 (e.g., actively tracking) during operation. In some examples, antenna assembly positioning system 135 can include both a system to control an azimuth orientation of an antenna, and a system to control an elevation orientation of an antenna.

The first antenna 141 and/or the second antenna 142 may operate in the International Telecommunications Union (ITU) Ku, K, or Ka-bands, for example from approximately 17 to 31 Giga-Hertz (GHz). Alternatively, the first antenna 141 and/or the second antenna 142 may operate in other frequency bands such as C-band, X-band, S-band, L-band, and the like. In various examples, the first antenna 141 and the second antenna 142 may be configured to operate in different frequency bands, or in the same frequency band. In a particular example, the first antenna 141 can be configured to operate at Ku-band (e.g., receiving signals between 10.95 and 12.75 GHz, and transmitting signals between 14.0 to 14.5 GHz), and the second antenna 142 can be configured to operate at Ka-band (e.g., receiving signals between 17.7 and 21.2 GHz, and transmitting signals between 27.5 to 31.0 GHz). In some examples, the first antenna 141 and the second antenna 142 may be configured with different dimensions, or other characteristics that may be leveraged in different communications circumstances, such as the first antenna 141 being relatively smaller and having a relatively lower transmission or reception directionality (e.g., relatively lower beam gain, relatively broader beam focus), and the second antenna being relatively larger and having a relatively greater transmission or reception directionality (e.g., relatively higher beam gain, relatively tighter beam focus).

In some examples of the satellite communication system 100, the first antenna 141 can be associated with the first satellite 105-*a*, and the second antenna 142 can be associated with the second satellite 105-*b*. In operation, the aircraft 130 can have a location that is within a coverage area of the first satellite 105-*a* and/or within a coverage area of the second satellite 105-*b*, and communications with either the first antenna 141 or the second antenna 142 can be selected based at least in part on the position of the aircraft 130. For instance, in a first mode of operation, while the aircraft 130 is located within a coverage area of the first satellite 105-*a*, the aircraft 130 can use the first antenna 141 of the multiple antenna system 140 to communicate with the first satellite 105-*a* over one or more first beams 151. In the first mode of operation, the second antenna 142 can be in an inactive state or idled state without maintaining a communications link with a satellite. In some examples, during at least a portion of the first mode of operation, the second antenna 142 may be physically idled, such that an actuation of a shared drive element (e.g., a drive element that is common to the first antenna 141 and the second antenna 142) does not actuate the second antenna 142.

In a second mode of operation, while the aircraft 130 is located within a coverage area of the second satellite 105-*b*, the aircraft 130 can use the second antenna 142 of the multiple antenna system 140 to communicate with the second satellite 105-*b* over one or more second beams 152-*b*. The second mode can be selected, for instance, in response to the aircraft 130 entering a coverage area of the second satellite 105-*b*, and/or leaving a coverage area of the first satellite 105-*a*. In the second mode of operation, the first antenna 141 can be in an inactive state or idled state without maintaining a communications link with a satellite. In some examples, during at least a portion of the second mode of operation, the first antenna 141 may be physically idled, such that an actuation of a shared drive element does not actuate the first antenna 141. In examples where the aircraft is located within an overlapping coverage area of both the first satellite 105-*a* and the second satellite 105-*b*, the second mode can be selected based on other factors, such as network availability, communication capacity, communication costs, signal strength, signal quality, and the like.

In other examples of the satellite communication system 100, the first antenna 141 and the second antenna 142 can both be associated with the first satellite 105-*a*. In the first mode of operation the aircraft 130 can use the first antenna 141 to communicate with the first satellite 105-*a* over one or more first beams 151, and in an alternate example of the second mode of operation, the aircraft 130 can use the second antenna 142 to communicate with the first satellite 105-*a* over one or more second beams 152-*a*. The alternate example of the second mode can be selected, for instance, in the event of an error condition, a fault condition, or a degradation of the first antenna 141, where the second antenna 142 can provide backup communications. Additionally or alternatively, the alternate example of the second mode can be selected to change from a first frequency band and/or communications protocol associated with the first antenna 141 to a second frequency band and/or communications protocol associated with the second antenna 142. Additionally or alternatively, to support communications under various circumstances, the multiple antenna system 140 may be configured to select either the first antenna 141 or the second antenna 142 based on other criteria, such as a size or positioning constraint of one or both of the first antenna 141 or the second antenna 142, or an antenna or beam characteristic of one or both of the first antenna 141 or the second antenna 142.

The communication system of the aircraft 130 can provide communication services for communication devices within the aircraft 130 via a modem (not shown). Communication devices may utilize the modem to connect to and access at least one of the first network 120-a or the second network 120-b via the multiple antenna system 140. For example, mobile devices may communicate with at least one of the first network 120-a or the second network 120-b via network connections to modem, which may be wired or wireless. A wireless connection may be, for example, of a wireless local area network (WLAN) technology such as IEEE 802.11 (Wi-Fi), or other wireless communication technology.

The size of the multiple antenna system 140 may directly impact the size of the radome 145, for which a low profile may be desired. In other examples, other types of housings are used with the multiple antenna system 140. Additionally, the multiple antenna system 140 may be used in other applications besides onboard the aircraft 130, such as onboard boats, automobiles or other vehicles, or on ground-based stationary systems.

Figure 2A:
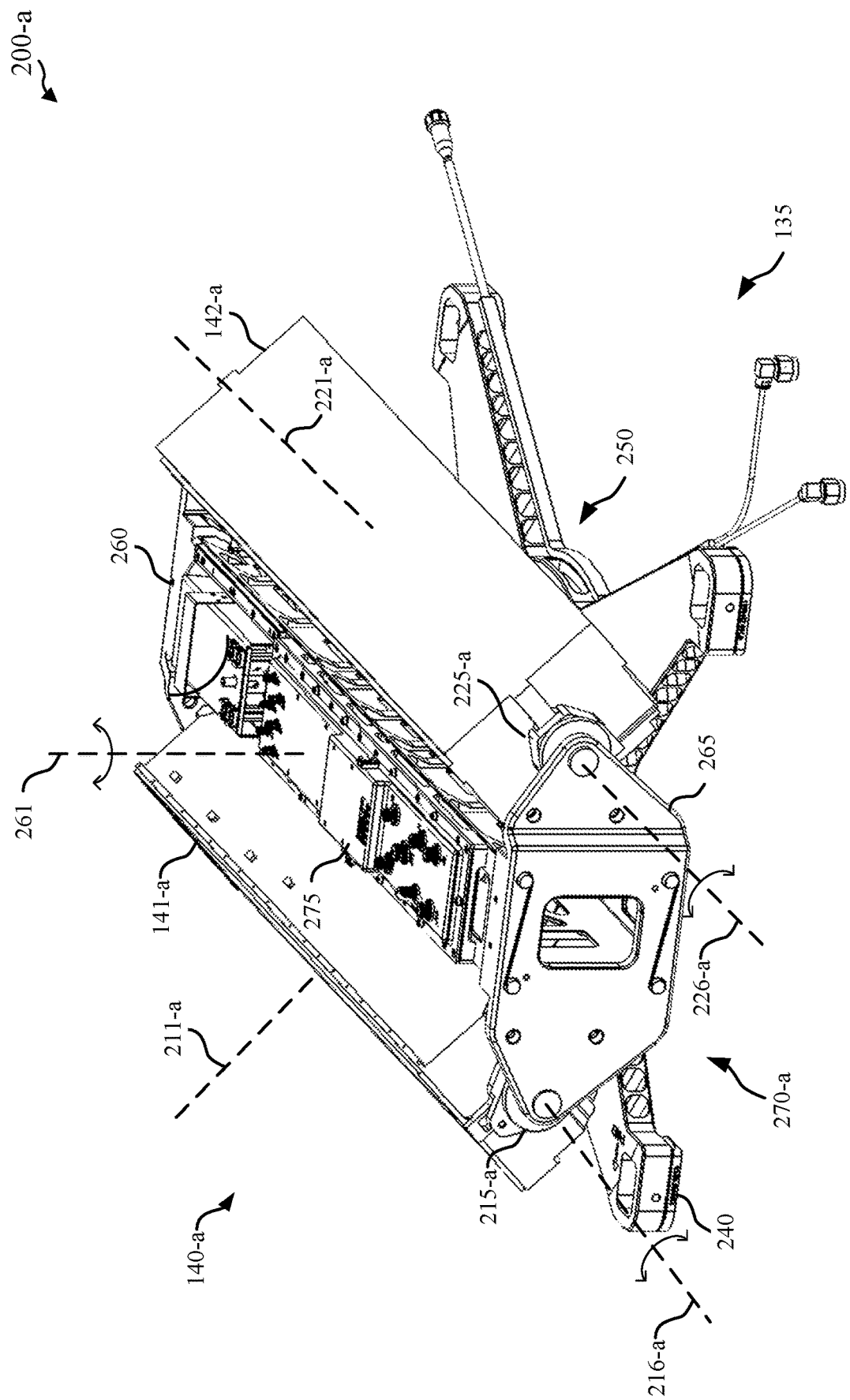
FIG. 2A shows a view of a multiple antenna system in accordance with various aspects of the present disclosure.

FIG. 2A shows a view 200-a of a multiple antenna system 140-a in accordance with various aspects of the present disclosure. As shown in view 200-a, the multiple antenna system 140-a includes a first antenna 141-a and a second antenna 142-a. The first antenna 141-a can have a first antenna boresight 211-a, which corresponds to the direction of maximum gain of the first antenna 141-a. The first antenna 141-a is coupled with a first spindle 215-a rotating about a first spindle axis 216-a. In some examples, rotation of the first spindle 215-a about the first spindle axis 216-a may provide an elevation adjustment to the first antenna boresight 211-a. The second antenna 142-a can have a second antenna boresight 221-a, which corresponds to the direction of maximum gain of the second antenna 142-a. The second antenna 142-a is coupled with a second spindle 225-a rotating about a second spindle axis 226-a. In some examples, rotation of the second spindle 225-a about the second spindle axis 226-a may provide an elevation adjustment to the second antenna 142-a.

The first spindle 215-a and the second spindle 225-a can be rotatably coupled with a spindle support structure 265 by one or more rotating bearings associated with each of the first spindle 215-a and the second spindle 225-a. In some examples, the support provided by the spindle support structure 265 can rigidly fix the locations of the first spindle axis 216-a and the second spindle axis 226-a. In other examples the first spindle axis 216-a and the second spindle axis 226-a may move with respect to the spindle support structure 265, by way of a compliant coupling and/or a kinematic linkage between the first spindle 215-a and/or the second spindle 225-a and spindle support structure 265.

The multiple antenna system 140-a may be mounted to the aircraft 130 by way of a base element 240. The multiple antenna system 140-a may further include an antenna assembly positioning system 135-a, including, for example, an azimuth drive 250 and a multiple-antenna positioner 270-a. The azimuth drive 250 can provide rotation of an azimuth base 260 about an azimuth axis 261, and the multiple-antenna positioner 270-a can provide rotation of the first spindle 215-a about the first spindle axis 216-a, and the second spindle 225-a about the second spindle axis 226-a to provide adjustment in elevation. In some examples, the spindle support structure 265 can be one or more removable portions of an azimuth base 260, and in other examples the spindle support structure 265 can be a portion of an azimuth base 260 formed as a single workpiece.

In a first mode of operation of the multiple antenna system 140-a, a rotation of the azimuth base 260 about the azimuth axis 261, in combination with a rotation of the first spindle 215-a about the first spindle axis 216-a, can direct the first antenna boresight 211-a towards a satellite 105. In a second mode of operation, a rotation of the azimuth base 260 about the azimuth axis 261, in combination with a rotation of the second spindle 225-a about the second spindle axis 226-a, can direct the second antenna boresight 221-a towards a satellite 105. When configured in this manner, a single drive element of the multiple-antenna positioner 270-a can provide adjustment to both the first antenna 141-a and the second antenna 142-a. Compared to single antenna systems, this configuration can provide benefits including the support of multiple frequency bands or the availability of redundant antennas or antennas that are otherwise selectable for particular communication characteristics. Compared to multiple antenna systems that have a drive element for each antenna, this configuration can provide benefits including reduced cost, reduced weight, and reduced complexity.

The antenna assembly positioning system 135-a is responsive to commands from an antenna control unit 275 to position the first antenna 141-a and the second antenna 142-a to direct either the first antenna boresight 211-a or the second antenna boresight 221-a towards a target. In addition, the commands from the antenna control unit 275 can be used to control whether the first antenna 141-a or the second antenna 142-a is used to communicate one or more signals between the multiple antenna system 140-a and the target. In other words, the antenna assembly positioning system 135-a points one of the first antenna 141-a and the second antenna 142-a at the target to provide communication between the multiple antenna system 140-a and the target, while the other of the first antenna 141-a and the second antenna 142-a may or may not be pointed in a direction other than the target and may not be used for communication. The multiple antenna system 140-a may also include additional components to facilitate communication of the signals. The components of the antenna control unit 275 can include processor(s), storage device(s), input device(s), output device(s), communication systems, data buses and working memory, which can include operating systems and applications/programs. Although illustrated as part of multiple antenna system 140-a, aspects of the antenna control unit 275 may be implemented in components external to the multiple antenna system 140-a, such as within a modem or other control unit located, for example, within the fuselage of an aircraft.

Figure 2B:
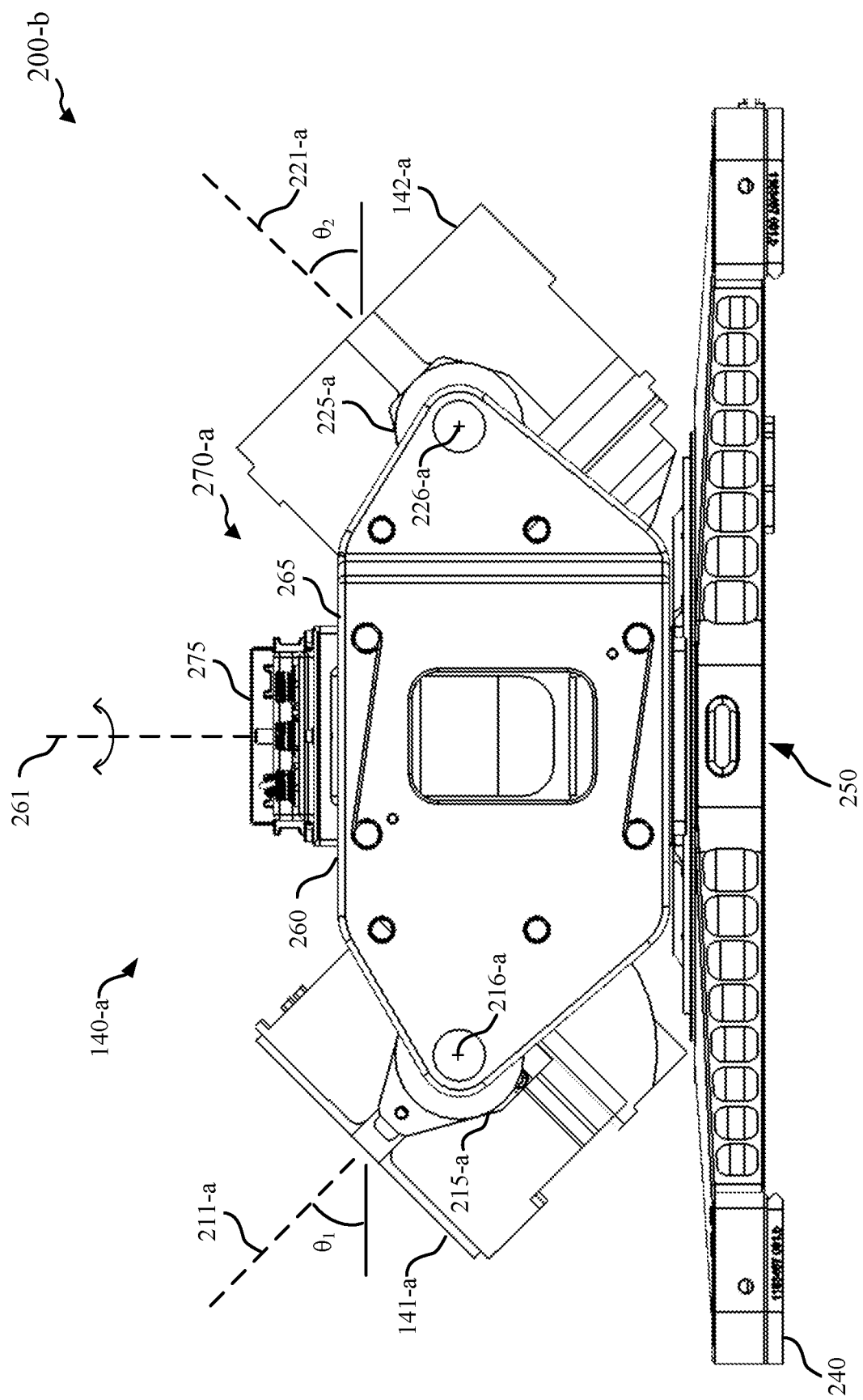
FIG. 2B shows a view of the multiple antenna system in accordance with various aspects of the present disclosure.

FIG. 2B shows a view 200-b of the multiple antenna system 140-a in accordance with various aspects of the present disclosure. View 200-b shows multiple antenna system 140-a as seen in line with the first spindle axis 216-a. As shown, the first antenna boresight 211-a is in the plane of the view, and has a first nominal elevation angle $\theta_1$. In some examples, such as the example shown in FIG. 2B, the second spindle axis 226-a can be parallel to the first spindle axis 216-a. In such an example, as shown, the second antenna boresight 221-*a* is also in the plane of the view, and can have a second nominal elevation angle $\theta_2$. In various examples, the first nominal elevation angle $\theta_1$ and the second nominal elevation angle of $\theta_2$. can be the same angle, or can be different angles. Therefore, in some examples the first nominal elevation angle $\theta_1$ and the second nominal elevation angle $\theta_2$ can be configured such that the first antenna boresight 211-*a* and the second antenna boresight 221-*a* are parallel (e.g., having a same elevation angle or orientation) or non-parallel (e.g., having different elevation angles or orientations). In some examples, the first nominal elevation angle $\theta_1$ and the second nominal elevation angle $\theta_2$ can be configured such that the first antenna boresight 211-*a* and the second antenna boresight 221-*a* are separated by a particular angle (e.g., 90 degrees, etc.).

In the illustrated example, where the first spindle axis 216-*a* and the second spindle axis 226-*a* are parallel, and the first antenna boresight 211-*a* and the second antenna boresight 221-*a* are perpendicular to their respective spindle axes, the first antenna boresight 211-*a* and the second antenna boresight 221-*a* can be separated by 180 degrees with respect to an azimuth axis 261. Said a different way, the projection of the first antenna boresight 211-*a* and the projection of the second antenna boresight 221-*a* on to a plane perpendicular to the azimuth axis 261 can be separated by 180 degrees. In other examples, the first antenna boresight 211-*a* and the second antenna boresight 221-*a* can be separated by some other angle with respect to an azimuth axis (e.g., having a same angle or orientation relative to the azimuth axis 261), which may or may not change over a range of actuation.

The multiple-antenna positioner 270-*a* can have a single drive element operable to adjust both the first antenna boresight 211-*a* and the second antenna boresight 221-*a* (e.g., relative to an elevation degree of freedom). In some examples, the multiple-antenna positioner 270-*a* can be configured in a manner such that an increase in an elevation angle of the first antenna boresight 211-*a* has a corresponding decrease in an elevation angle of the second antenna boresight 221-*a*, or vice-versa. In other examples, the multiple-antenna positioner 270-*a* can be configured in a manner where an elevation angle of the first antenna boresight 211-*a* and an elevation angle of the second antenna boresight 221-*a* can both increase or both decrease in response to the drive element. This can be true, for instance, where the nominal elevation angle of the first antenna boresight 211-*a* and the nominal elevation angle of the second antenna boresight 221-*a* are 90 degrees, and elevation angle is considered to be an absolute value with respect to a horizontal plane. This can also be the case where the nominal elevation angle of the first antenna boresight 211-*a* and the nominal elevation angle of the second antenna boresight 221-*a* are measured from the same azimuth direction (as opposed to having a separation of 180 degrees with respect to an azimuth axis as shown in FIG. 2B). Furthermore, an elevation angle of the first antenna boresight 211-*a* and an elevation angle of the second antenna boresight 221-*a* can both increase or both decrease in response to the drive element by way of an additional linkage and/or gearing which causes the first spindle 215-*a* and the second spindle 225-*a* to rotate in opposite directions.

Figure 3A:
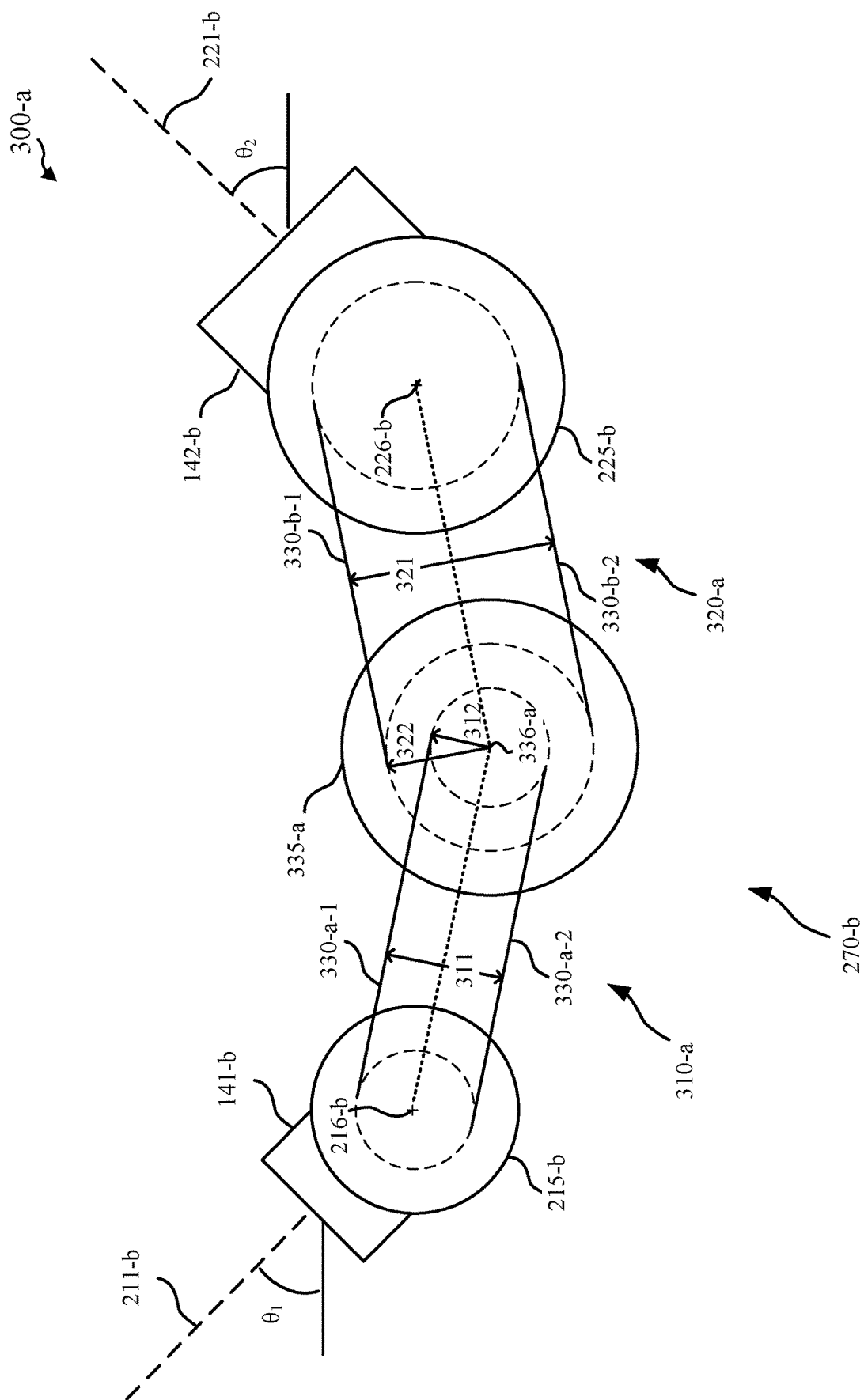
FIG. 3A shows a schematic view of a first state of a multiple-antenna positioner in accordance with various aspects of the present disclosure.

FIG. 3A shows a schematic view of a first state 300-*a* of a multiple-antenna positioner 270-*b* in accordance with various aspects of the present disclosure. The multiple-antenna positioner 270-*b* includes a first spindle 215-*b* which is coupled with a first antenna 141-*b*, and a second spindle 225-*b* which is coupled with a second antenna 142-*b*.

The multiple-antenna positioner 270-*b* further includes a third spindle 335-*a*, which rotates about a third spindle axis 336. The first spindle 215-*b*, the second spindle 225-*b*, and the third spindle 335-*a* can all be rotatably coupled, for example, to a spindle support structure such as spindle support structure 265 described with reference to FIGS. 2A and 2B (not shown). As previously described, in various examples the spindle support structure may provide fixed relative locations between any of the first spindle axis 216-*b*, the second spindle axis 226-*b*, and the third spindle axis 336-*a*, or may provide relative movement between any of the first spindle axis 216-*b*, the second spindle axis 226-*b*, and the third spindle axis 336-*a* by way of a compliant member or a kinematic linkage.

The third spindle 335-*a* is further coupled with a drive element. The drive element may include any element suitable for rotating the third spindle 335-*a*, which in some examples may include a motor, and may further include a gearbox. The motor may be any motor suitable for providing a rotation of the third spindle 335-*a*, including an AC electric motor, a DC electric motor, a hydraulic motor, or any other suitable motor. The gearbox, where included in the drive system, may be any mechanism suitable for providing a mechanical ratio between the motor and the third spindle 335-*a*, any may include any of a bevel gear, a helical gear, a worm gear, a clutch, a hydraulic transmission, and any other suitable mechanism. In some examples, the motor and the gearbox can be integrated into a single assembly, and be configured as a gearmotor. In some alternative examples, the drive element may drive the first spindle 215-*b* or the second spindle 225-*b* instead of the third spindle 335-*a*, which may support the third spindle 335-*a* being omitted from a multiple-antenna positioner 270.

As shown in the schematic view of the first state 300-*a* of the illustrated example, the first spindle axis 216-*b* can be at a different height than the third spindle axis 336-*a*, and the second spindle axis 226-*b* can be at a different height than the third spindle axis 336-*a*. In various examples, each of the first spindle axis 216-*b*, the second spindle axis 226-*b*, and the third spindle axis 336-*a* can be at different heights, or they can each be at the same height. In other words, the first spindle axis 216-*b*, the second spindle axis 226-*b*, and the third spindle axis 336-*a* can all be coplanar, or non-coplanar. Furthermore, the first spindle 215-*b* and the second spindle 225-*b* can be on opposing sides of the third spindle 335-*a*.

In the illustrated example, the third spindle 335-*a* is coupled with the first spindle 215-*b* by way of a first pair of link arms 310-*a*, the first pair of link arms 310-*a* including a first link arm 330-*a*-1 and a second link arm 330-*a*-2. The third spindle 335 is also coupled with the second spindle 225-*b* by way of a second pair of link arms 320-*a*, the second pair of link arms 320-*a* including a third link arm 330-*b*-1 and a fourth link arm 330-*b*-2. Any of the link arms 330 can have either a fixed length or a variable length. The coupling of each of the link arms 330 to any of the first spindle 215-*b*, the second spindle 225-*b*, and the third spindle 335-*a* can provide a rotational degree of freedom at the coupling, such as the degree of freedom provided by a cylindrical bearing or a spherical bearing. Such bearings can be selected, for instance, to provide an efficient, low-friction interface between components to improve accuracy of antenna positioning, and/or to reduce the energy required of the drive element to provide antenna positioning.

As shown in the schematic view of the first state 300-*a* of the illustrated example, the first link arm 330-*a*-1 and the second link arm 330-*a*-2 can be parallel to each other, and separated by a first separation distance 311, and the third link arm 330-*b*-1 and the fourth link arm 330-2 can be parallel to each other, and separated by a second separation distance 321. In the illustrated example, the second separation distance 321 is different from the first separation distance 311. In other examples, the second separation distance 321 can be equal to the first separation distance 311.

In some examples, the first link arm 330-*a*-1 and the second link arm 330-*a*-2 can be non-parallel, and/or the third link arm 330-*b*-1 and the fourth link arm 330-*b*-2 can be non-parallel. In such examples where the first link arm 330-*a*-1 and the second link arm 330-*a*-2 are non-parallel, and/or the third link arm 330-*b*-1 and the fourth link arm 330-*b*-2 are non-parallel, the first spindle axis 216-*b* can be at a non-fixed location with respect to the third spindle axis 336-*a*, or the second spindle axis 226-*b* can be at a non-fixed location relative to the third spindle axis 336-*a*. Furthermore, in the present example, the first spindle axis 216-*b* can be parallel to the second spindle axis 226-*b*. In other examples, the first spindle axis 216-*b* and the second spindle axis 226-*b* can be non-parallel. A non-fixed location between any of the first spindle axis 216-*b*, the second spindle axis 226-*b*, and the third spindle axis 336-*a* can be provided by a kinematic linkage, or by an elastic member, such as an elastic link arm 330, an elastic bushing at a bearing location of any of the first spindle 215-*b*, the second spindle 225-*b*, and the third spindle 335-*a*, or another elastic member of the multiple-antenna positioner 270-*b*.

The first link arm 330-*a*-1 can have a coupling location at the third spindle 335-*a* at a first radial distance 312 and the third link arm 330-*b*-1 can have a coupling location at the third spindle 335-*a* at a second radial distance 322. In the present example, the second radial distance 322 is different from the first radial distance 312. In other examples, the second radial distance 322 can be the same as the first radial distance 312. In the present example, an angular location on the third spindle 335-*a* of a coupling between the first link arm 330-*a*-1 and the third spindle 335-*a* is different from an angular location on the third spindle 335-*a* of a coupling between the third link arm 330-*b*-1 and the third spindle 335-*a*. In other examples, an angular location on the third spindle 335-*a* of a coupling between the first link arm 330-*a*-1 and the third spindle 335-*a* be the same as an angular location on the third spindle 335 of a coupling between the third link arm 330-*b*-1 and the third spindle 335-*a*. That is, ends of the link arms 330-*a*-1 and 330-*b*-1 may be rotationally coupled with the third spindle 335-*a* about a same rotational axis.

When coupled in the manner of the illustrated example, the driven angular rotation of the third spindle 335-*a* simultaneously causes the angular rotation of both the first spindle 215-*b* and the second spindle 225-*b*, and consequently provides a simultaneous adjustment to the elevation angles of both the first antenna boresight 211-*b* and the second antenna boresight 221-*b*.

Figure 3B:
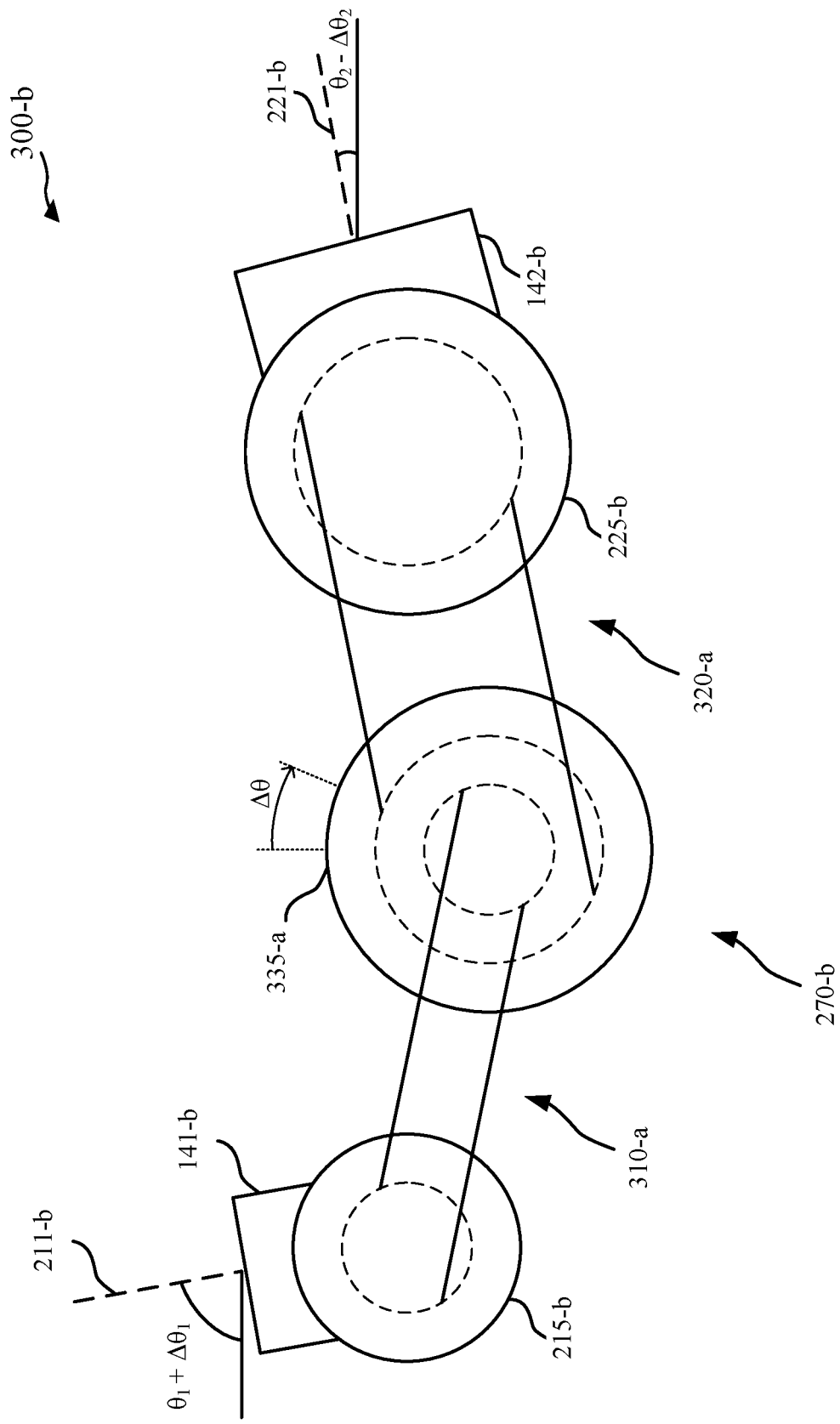
FIG. 3B shows a schematic view of a second state of a multiple-antenna positioner in accordance with various aspects of the present disclosure.

FIG. 3B shows a schematic view of a second state 300-*b* of the multiple-antenna positioner 270-*b* in accordance with various aspects of the present disclosure. In the second state of the illustrated example, for instance, the third spindle 335-*a* can have a driven angular rotation equal to $\Delta\theta$ compared to the schematic view of the first state 300-*a* in FIG. 3A. The driven angular rotation can, for instance, direct the first antenna boresight 211-*b* towards a satellite to establish or maintain a communications link using the first antenna 141-*b*, or direct the second antenna boresight 221-*b* towards a satellite to establish or maintain a communications link using the second antenna 142-*b*. For example, the driven angular rotation can be determined by an antenna control unit 275 to provide an initial adjustment to the elevation angle of the first antenna boresight 211-*b* to establish a communications link with a satellite using the first antenna 141-*b*. The driven angular rotation can then be determined by the antenna control unit 275 to maintain the communications link with the satellite over time by compensating for movement of the satellite and/or a vehicle carrying the multiple-antenna positioner, such as an aircraft.

As shown, the driven angular rotation can simultaneously cause an angular rotation of the first spindle 215-*b* equal to 401 and an angular rotation of the second spindle 225-*b* equal to 402. Compared to the schematic view of the first state 300-*a* in FIG. 3A, the driven angular rotation can increase an elevation angle of the first antenna boresight 211-*b* to an elevation angle equal to $\theta_1+\Delta\theta_1$, and the driven angular rotation can decrease an elevation angle of the second antenna boresight 221-*b* to an angle equal to $\theta_2-\Delta\theta_2$. In some examples, $\Delta\theta_1$ can be equal to $\Delta\theta_2$, so that the increase in an elevation angle of the first antenna boresight 211-*b* can be equal to the decrease in an elevation angle of the second antenna boresight 221-*b*.

Some antenna positioning systems may exhibit a degree of backlash, which limits the accuracy and/or responsiveness of the positioning of an antenna boresight. With respect to the present example, a degree of backlash can refer, for example, to an amount of driven rotation of the third spindle 335-*a* which does not result in an immediate rotation of the first spindle 215-*b* and/or the second spindle 225-*b*. A degree of backlash can also refer to an amount of uncontrolled rotation of either of the first spindle 215-*b* or the second spindle 225-*b*, which allows an elevation angle of the first antenna boresight 211-*b* or the second antenna boresight 221-*b* to change despite the third spindle 335-*a* being held in a fixed position.

A degree of backlash can be caused by, for instance, a loose mechanical fit. A loose mechanical fit may be caused by a shaft or bearing being loose in a collar, a rolling bearing element being smaller than the corresponding gap between two bearing races, a fastener being smaller than a hole for the fastener, or any other cause of two mechanical components lacking direct contact. The loose mechanical fit may be a result at least one of the design of various components of the multiple-antenna positioner 270-*b*, the manufacture of various components of the multiple-antenna positioner 270-*b*, or the degradation of various components of the multiple-antenna positioner 270-*b* over time.

At least one of the first link arm 330-*a*-1, the second link arm 330-*a*-2, the third link arm 330-*b*-1, or the fourth link arm 330-*b*-2 can be adjusted to reduce a degree of backlash between the third spindle 335-*a* and at least one of the first spindle 215-*b* or the second spindle 225-*b*. For example, first pair of link arms 310-*a*, comprising the first link arm 330-*a*-1 and the second link arm 330-*a*-2, which couple the third spindle 335-*a* to the first spindle 215-*b*, can be adjusted to reduce a degree of backlash between the third spindle 335-*a* and the first spindle 215-*b*, which may be the result of a looseness in mechanical fit between various components of the multiple-antenna positioner 270-*b*.

The looseness of mechanical fit between various components of the multiple-antenna positioner 270-*b* that contribute to the degree of backlash between the third spindle 335-*a* and the first spindle 215-*b* can, for instance, be a result of at least one of a coupling gap between the first spindle 215-*b* and the first link arm 330-*a*-1, a coupling gap between the first spindle 215-*b* and the second link arm 330-*a*-2, a coupling gap between the third spindle 335-*a* and the first link arm 330-*a*-1, or a coupling gap between the third spindle 335-*a* and the second link arm 330-*a*-2. The looseness of mechanical fit between various components of the multiple-antenna positioner 270-*b* that contribute to the degree of backlash between the third spindle 335-*a* and the first spindle 215-*b* can also include at least one of a loose or worn bearing of the first spindle 215-*b*, or a loose or worn bearing of the third spindle 335-*a*. The looseness of mechanical fit between various components of the multiple-antenna positioner 270-*b* that contribute to the degree of backlash between the third spindle 335-*a* and the first spindle 215-*b* can be a result a non-constrained positioning of a bearing of the first spindle 215-*b* or a non-constrained positioning of a bearing of the third spindle 335-*a*, where some other means of constraining the mechanical location is required.

To reduce a degree of backlash between the third spindle 335-*a* and the first spindle 215-*b*, the first pair of link arms 310-*a* can be adjusted to reduce, for instance, the looseness of mechanical fit between various components of the multiple-antenna positioner 270-*b*. For example, at least one of the first link arm 330-*a*-1 or the second link arm 330-*a*-2 can be adjusted to a longer length, which can reduce gaps between various components of the multiple-antenna positioner 270-*b*. Alternatively, at least one of the first link arm 330-*a*-1 or the second link arm 330-*a*-2 can be adjusted to a shorter length, which can also reduce gaps between various components of the multiple-antenna positioner 270-*b*. An adjustment to the length of the first link arm 330-*a*-1 and/or the second link arm 330-*a*-2 can be provided by a turnbuckle mechanism as described in greater detail with reference to FIG. 5. Alternatively, an adjustment to the length of the first link arm 330-*a*-1 and/or the second link arm 330-*a*-2 can be provided by any other suitable mechanism such as a jack screw, a gear screw, a worm gear, a hydraulic or pneumatic cylinder, a linear actuator, and the like.

A degree of backlash may also refer to a level of preload in a portion of the multiple-antenna positioner 270-*b*. For instance, at least one of the first link arm 330-*a*-1 or the second link arm 330-*a*-2 can be adjusted to a longer length, such that mechanical gaps between various components of the multiple-antenna positioner 270-*b* are eliminated, substantially eliminating backlash between the third spindle 335-*a* and the first spindle 215-*b*. At least one of the first link arm 330-*a*-1 or the second link arm 330-*a*-2 can be further adjusted to an incrementally longer length, which can cause both the first link arm 330-*a*-1 and the second link arm 330-*a*-2 to carry a compressive preload. The compressive preload of the first link arm 330-*a*-1 and the second link arm 330-*a*-2 can be resolved by, for instance, a corresponding tensile preload in a structure that supports the first spindle 215-*b* and the second spindle 225-*b*, such as the spindle support structure 265 described with respect to FIGS. 2A and 2B. The compressive preload of the first link arm 330-*a*-1 and the second link arm 330-*a*-2 can maintain the eliminated backlash between the third spindle 335-*a* and the first spindle 215-*b* over time by compensating for the wear of various components of the multiple-antenna positioner 270-*b* over time. This compensation over time is a result of the elasticity of elastic components in the multiple-antenna positioner 270-*b*, which have a first size at an initial degree of compressive preload, and a second size at a reduced degree of compressive preload. As various components of the multiple-antenna positioner 270-*b* experience wear over time, elastic components of the multiple-antenna positioner 270-*b* can compensate by changing from a first size to a second size, which reduces the degree of compressive preload in the first link arm 330-*a*-1 and the second link arm 330-*a*-2, but maintains the eliminated backlash between the third spindle 335-*a* and the first spindle 215-*c* over time. Although not described in detail, third link arm 330-*b*-1 and/or fourth link arm 330-*b*-2 may be similarly adjusted to, for example, reduce a degree of backlash between the second spindle 225-*b* and the third spindle 335.

In some examples, at least one of the first link arm 330-*a*-1 or the second link arm 330-*a*-2 can be adjusted to a shorter length, such that mechanical gaps between various components of the multiple-antenna positioner 270-*b* are eliminated, substantially eliminating backlash between the third spindle 335-*a* and the first spindle 215-*b*. At least one of the first link arm 330-*a*-1 or the second link arm 330-*a*-2 can be further adjusted to an incrementally shorter length, which can cause both the first link arm 330-*a*-1 and the second link arm 330-*a*-2 to carry a tensile preload. The tensile preload of the first link arm 330-*a*-1 and the second link arm 330-*a*-2 can be resolved by, for instance, a corresponding compressive preload in a structure that supports the first spindle 215-*b* and the second spindle 225-*b*, such as the spindle support structure 265 described with respect to FIGS. 2A and 2B. The compressive preload of the first link arm 330-*a*-1 and the second link arm 330-*a*-2 can maintain the eliminated backlash between the third spindle 335-*a* and the first spindle 215-*b* over time by compensating for the wear of various components of the multiple-antenna positioner 270-*b* over time. This compensation over time is a result of the elasticity of elastic components in the multiple-antenna positioner 270-*b*, which have a first size at an initial degree of tensile preload, and a second size at a reduced degree of tensile preload. As various components of the multiple-antenna positioner 270-*b* experience wear over time, elastic components of the multiple-antenna positioner 270-*b* can change from a first size to a second size, which reduces the degree of tensile preload, but maintains the eliminated backlash between the third spindle 335-*a* and the first spindle 215-*b* over time. Although not described in detail, third link arm 330-*b*-1 and/or fourth link arm 330-*b*-2 may be similarly adjusted to, for example, reduce a degree of backlash between the second spindle 225-*b* and the third spindle 335-*a*.

In some examples, both the first pair of link arms 310-*a*, and the second pair of link arms 320-*a* can be adjusted to a compressive preload as described above. In other examples, both the first pair of link arms 310-*a* and the second pair of link arms 320-*a* can be adjusted to a tensile preload as described above. In some examples, one of the first pair of link arms 310-*a* and the second pair of link arms 320-*a* can be adjusted to a tensile preload, and the other can be adjusted to a compressive preload as described above. By way of any of these methods, a degree of backlash in the multiple-antenna positioner 270-*b* can be reduced.

In some examples, it may therefore be desirable to select a particular degree of component elasticity to balance a level of preload of the multiple-antenna positioner 270-*b* with a level of wear to be compensated. This selection may further include the consideration of a mechanical load applied to a bearing of the first spindle 215-*b*, a mechanical load applied to a bearing of the second spindle 225-*b*, and/or a mechanical load applied to a bearing of the third spindle 335-*a*. In an example, the selection of a particular degree of elasticity may be specifically directed towards the selection of an elasticity of at least one of the first link arm 330-*a*-1, the second link arm 330-*a*-2, the third link arm 330-*b*-1, and the fourth link arm 330-*b*-2, where the degree of elasticity can be a combination of material properties and component geometry.

By reducing a degree of backlash in the multiple-antenna positioner 270-b, the multiple-antenna positioner can have a favorable degree of stiffness, such that the accuracy and/or responsiveness of the positioning of an antenna boresight is improved. For instance, the reduction in backlash can improve the responsiveness of the first antenna boresight 211-b and/or the second antenna boresight 221-b to a driven angular rotation equal to Δθ of the third spindle 335-a. The reduction of backlash can also reduce an amount of uncontrolled rotation of either of the first spindle 215-b or the second spindle 225-b while the third spindle 335 is held in a fixed position, helping to maintain an elevation angle of the first antenna boresight 211-b or the second antenna boresight 221-b.

Figure 4A:
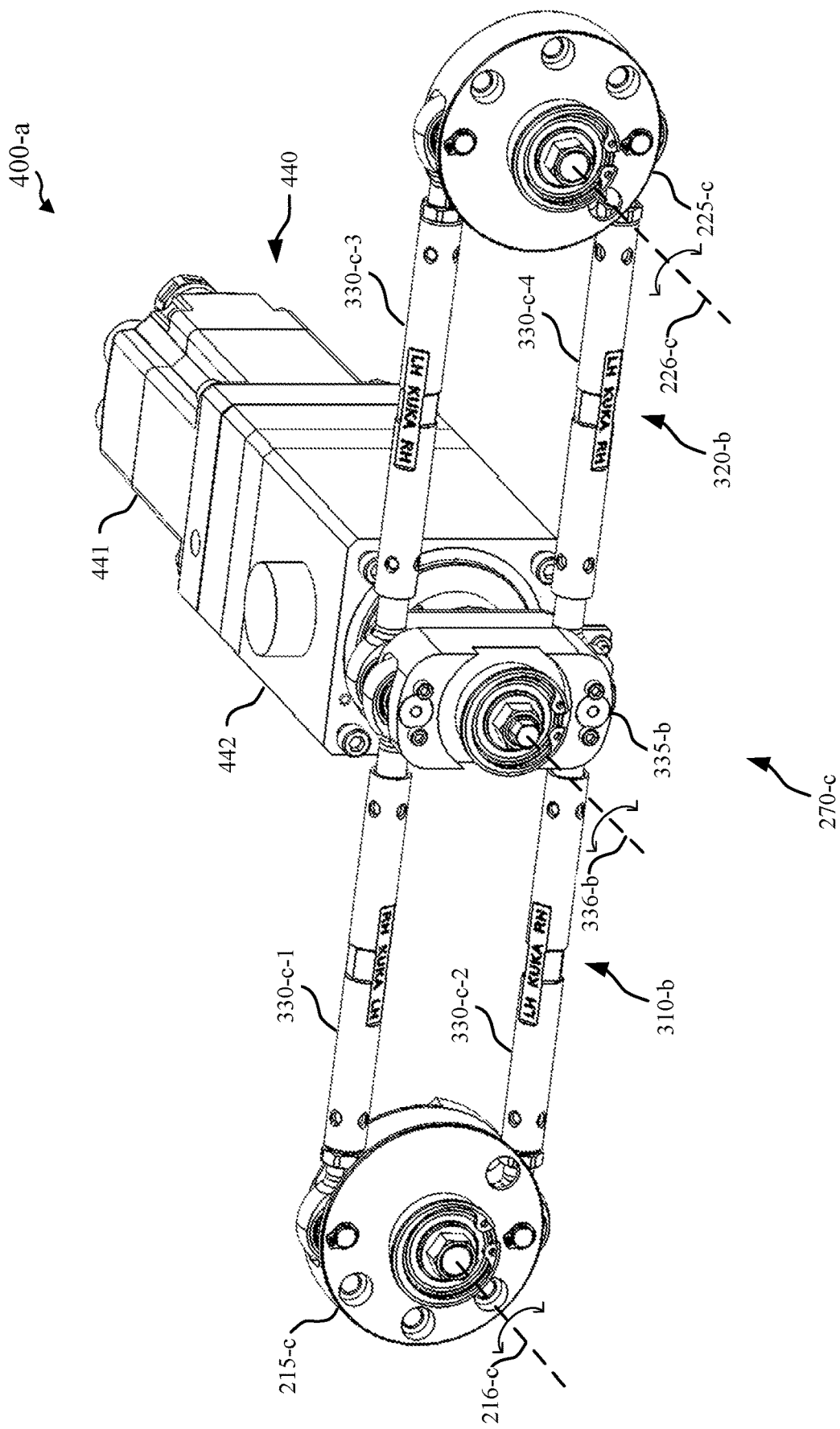
FIG. 4A shows a view of a multiple-antenna positioner in accordance with various aspects of the present disclosure.

FIG. 4A shows a first view 400-a of a multiple-antenna positioner 270-c in accordance with various aspects of the present disclosure. The multiple-antenna positioner 270-c may illustrate aspects of the multiple-antenna positioners 270 of FIG. 2A, 2B, 3A, or 3B. The multiple-antenna positioner 270-c includes a first spindle 215-c which is coupled with a first antenna (e.g., antennas 141 of FIG. 1, 2A, 2B, 3A or 3B, etc.), and a second spindle 225-c which is coupled with a second antenna (e.g., antennas 142 of FIG. 1, 2A, 2B, 3A or 3B, etc.). The multiple-antenna positioner includes a third spindle 335-b, which rotates about third spindle axis 336-a and is coupled with a drive element 440. The drive element 440 may include any element suitable for rotating the third spindle 335-b, which in some examples may include a motor 441, and may further include a gearbox 442. The motor 441 may be any motor suitable for providing a rotation of the third spindle, including an AC electrical motor, a DC electrical motor, a hydraulic motor, or any other suitable motor. The gearbox 442 may be any mechanism suitable for providing a mechanical ratio between the motor and the third spindle 335-b, any may include any of a bevel gear, a helical gear, a worm gear, a clutch, a hydraulic transmission, and any other suitable mechanism. In some examples, the motor 441 and the gearbox 442 can be integrated into a single assembly, and be configured as a gearmotor. In some examples, the drive element 440 may drive the first spindle 215-c or the second spindle 225-c instead of the third spindle 335-b.

In the present example, the third spindle 335-b is coupled with the first spindle 215-c by way of a first pair of link arms 310-b, the first pair of link arms 310-b including a first link arm 330-c-1 and a second link arm 330-c-2. When coupled in this manner, a driven angular rotation of the third spindle 335-b causes an angular rotation of the first spindle 215-c. The third spindle 335-b is also coupled with the second spindle 225-c by way of a second pair of link arms 320-b, the second pair of link arms 320-b including a third link arm 330-c-3 and a fourth link arm 330-c-4. When coupled in this manner, a driven angular rotation of the third spindle 335 also causes an angular rotation of the second spindle 225-c. Therefore, in the present example, the driven angular rotation of the third spindle 335-b simultaneously causes the angular rotation of both the first spindle 215-c and the second spindle 225-c, and consequently provides a simultaneous adjustment to the elevation angle of both a first antenna boresight 211 of a first antenna 141 and a second antenna boresight 221 of a second antenna 142.

In some examples of the multiple-antenna positioner 270-c, it may be desirable to have various components of the multiple-antenna positioner 270-c be removably coupled with one another. Furthermore, it may be desirable to be able to remove a single component of the multiple-antenna positioner 270-c for repair or replacement without removing any of the other components of the multiple-antenna positioner 270-c. For instance, a multiple-antenna positioner 270-c can be configured such that any one of the first link arm 330-c-1, the second link arm 330-c-2, the third link arm 330-c-3, or the fourth link arm 330-c-4 is removable without removing any of the first spindle 215-c, the second spindle 225-c, the third spindle 335, or the drive element 440. These components may be removably coupled by way of various fastening techniques, such as a press-fit pin/axle, a pin/axle with an axially threaded portion, a bearing housing secured with one or more screws or bolts, an axle with a cotter pin, or any other known method of providing mechanical attachment. A multiple-antenna positioner 270-c can also be configured, for instance, such that the drive element 440 is removable without removing any of the first link arm 330-c-1, the second link arm 330-c-2, the third link arm 330-c-3, the fourth link arm 330-c-4 the first spindle 215-c, the second spindle 225-c, or the third spindle 335-b.

Figure 4B:
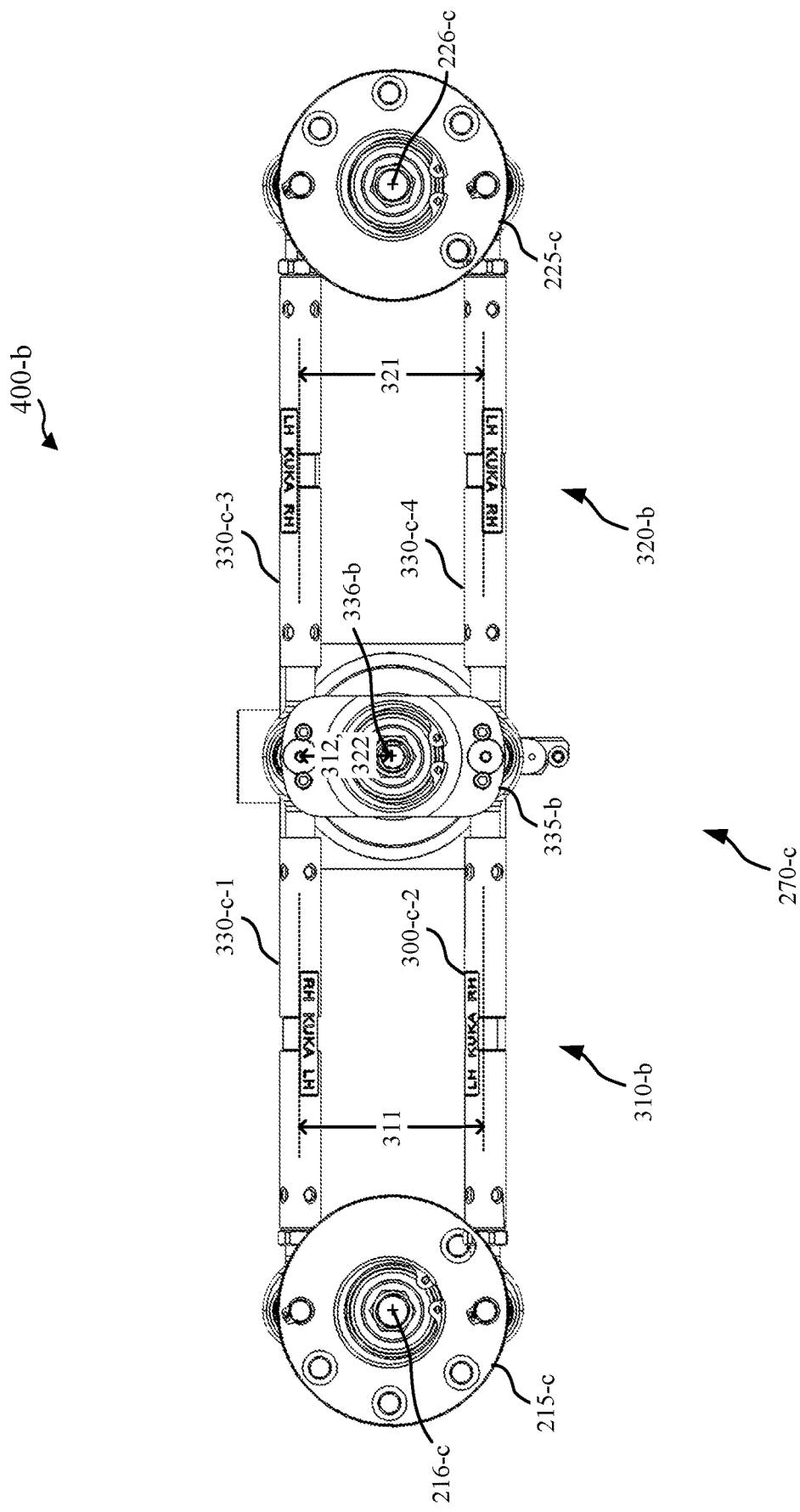
FIG. 4B shows an alternate view of the multiple-antenna positioner in accordance with various aspects of the present disclosure.

FIG. 4B shows a second view 400-b of the multiple-antenna positioner 270-c in accordance with various aspects of the present disclosure, with the view in line with the first spindle axis 216. As shown in view 400-b, the first link arm 330-c-1 and the second link arm 330-c-2 are parallel to each other, and separated by a first separation distance 311. Furthermore, first link arm 330-c-1 can have a coupling location at the third spindle 335-b at a first radial distance 312. In the illustrated example, the second spindle axis 226-c is parallel to the first spindle axis 216-c. The third link arm 330-c-3 and the fourth link arm 330-c-4 are parallel to each other, and separated by a second separation distance 321. In the illustrated example, the second separation distance 321 is the same as the first separation distance 311. In other examples, the second separation distance 321 can be different from the first separation distance 311. Third link arm 330-c-3 can have a coupling location at the third spindle 335-b at a second radial distance 322. In the illustrated example, the second radial distance 322 is the same as the first radial distance 312. In other examples, the second radial distance 322 can be different from the first radial distance 312. In the illustrated example, an angular location on the third spindle 335-b of a coupling between the first link arm 330-c-1 and the third spindle 335-b is the same as an angular location on the third spindle 335-b of a coupling between the third link arm 330-c-3 and the third spindle 335-b. In other examples, an angular location on the third spindle 335-b of a coupling between the first link arm 330-c-1 and the third spindle 335-b can be different from an angular location on the third spindle 335 of a coupling between the third link arm 330-c-3 and the third spindle 335-b.

In the present example, the first link arm 330-c-1, the second link arm 330-c-2, the third link arm 330-c-3, and the fourth link arm 330-c-4 are identical components. At least one of the first link arm 330-c-1, the second link arm 330-c-2, the third link arm 330-c-3, or the fourth link arm 330-c-4 can be adjusted to reduce a degree of backlash between the third spindle 335 and at least one of the first spindle 215-c or the second spindle 225-c, as previously described with respect to multiple-antenna positioners 270 of FIGS. 3A, 3B, and 4A. By reducing the degree of backlash, the multiple-antenna positioner 270-c can have a favorable degree of stiffness, such that the positioning of each of the antennas can be more responsive to a rotation of the drive spindle, and can also be more stable when the drive spindle is held in a fixed position.

In some examples, the operating temperature for the multiple-antenna positioner 270-c may change over time. In such examples, it may be desirable to limit the adverse effects of thermal expansion of various components of the multiple-antenna positioner 270-c. This may be accomplished, for instance, by using the same material for various components of the multiple-antenna positioner 270-c. For example, the first spindle 215-c, the second spindle 225-c, the third spindle 335-b, the first pair of link arms 310-b, and the second pair of link arms 320-b may all be formed substantially by stainless steel, so that each of those components expand together, and contract together, as the operating temperature for the multiple-antenna positioner 270-c changes over time.

Figure 5:
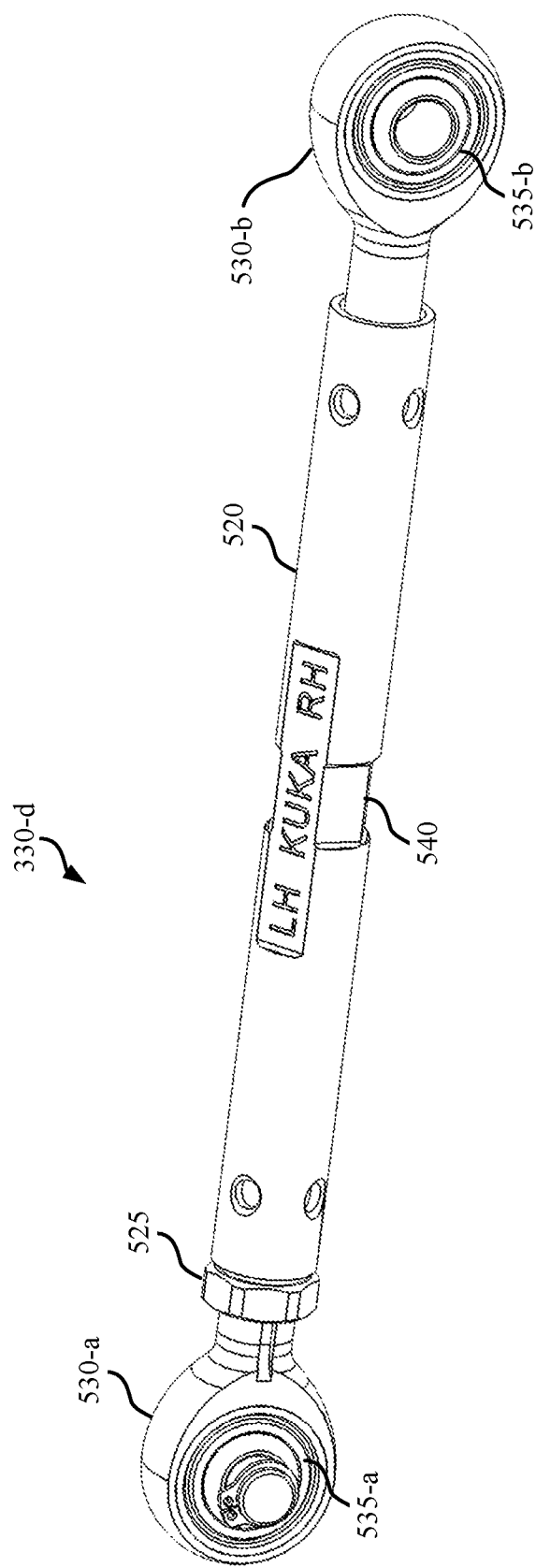
FIG. 5 shows an example of a link arm in accordance with various aspects of the present disclosure.

FIG. 5 shows an example of a link arm 330-d in accordance with various aspects of the present disclosure. The link arm 330-d can include a body portion 520, a first bearing rod end 530-a and a second bearing rod end 530-b. The body portion 520 can have internal threads at a first end to receive an externally threaded portion of the first bearing rod end 530-a. The body portion 520 can also have internal threads at a second end to receive an externally threaded portion of the second bearing rod end 530-b. The externally threaded portion of the first bearing rod end 530-a can be a left-handed thread, and the externally threaded portion of the second bearing rod end 530-b can be a right-handed thread. In this manner, the body portion 520, the first bearing rod end 530-a, and the second bearing rod end 530-b can combine to form a turnbuckle assembly.

When the link arm 330-d is configured as a turnbuckle assembly, a rotation of the body portion 520 along the axis between the first bearing rod end 530-a and the second bearing rod end 530-b, without a similar rotation of the first bearing rod end 530-a or the second bearing rod end 530-b, can cause a lengthening or shortening of the link arm 330-d. Specifically, the first bearing rod end 530-a and the second bearing rod end 530-b can be forced closer together, or farther apart. The rotation of the body portion 520 can be facilitated by a flat section 540, which can be configured to accept a wrench, or other suitable tool. To prevent unwanted rotation of the body portion 520, the link arm 330-d can also include a lock nut 525, engaged on the externally-threaded portion of the first bearing rod end 530-a, for instance. The lock nut 525 can be tightened onto the body portion 520, while the body portion 520 and the first bearing rod end 530-a are prevented from rotating, to provide a preload that prevents unwanted rotation of the body portion 520, which may lead to unwanted lengthening or shortening of the link arm 330-d.

The first bearing rod end 530-a and the second bearing rod end 530-b can include a first bearing 535-a and a second bearing 535-b, respectively. One or both of the first bearing 535-a and second bearing 535-b can be a cylindrical bearing to provide a rotational degree of freedom between the link arm 330-d and a spindle of a multiple-antenna positioning system, as described with respect to first spindles 215, second spindles 225, third spindles 335, and link arms 330 in FIG. 2A, FIG. 2B, FIG. 3A, FIG. 3B, FIG. 4A, and FIG. 4B. A cylindrical bearing can be any roller bearing, such as those that use ball bearings, cylindrical rolling elements, or spherical rolling elements, or alternatively the cylindrical bearing can be a sleeve bushing. The rotational degree of freedom can, for instance, reduce friction and/or reduce wear between coupled components, and thereby reduce the torque required of the drive element 440 to rotate the first spindle 215-c and the second spindle 225-c, and also reduce the propensity for a degree of backlash to increase over time.

One or both of the first bearing 535-a and 535-b may alternatively be a spherical bearing, such as a ball joint, to provide a spherical degree of freedom. The spherical degree of freedom, in addition to providing the rotational degree of freedom required by the multiple-antenna positioners 270-b and 270-c, can also provide a further degree of freedom that can, for example, compensate for misalignment. The spherical degree of freedom can also provide for a configuration where a first spindle axis 216, a second spindle axis 226, and a third spindle axis 336 are non-parallel.

The link arm 330-d can be designed to have a certain elasticity, as described with respect to link arms 330 of FIG. 3B. For instance, any of the body portion 520, the first bearing rod end 530-a, and the second bearing rod end 530-b can be made from a material that has a suitable modulus of elasticity. Furthermore, any of the body portion 520, the first bearing rod end 530-a, and the second bearing rod end 530-b can have a geometry that provides a suitable elasticity. Suitable geometry may include a cross section through a part, a length of a part, or any portion of a part that provides suitable elasticity in a localized region.

Figure 6:
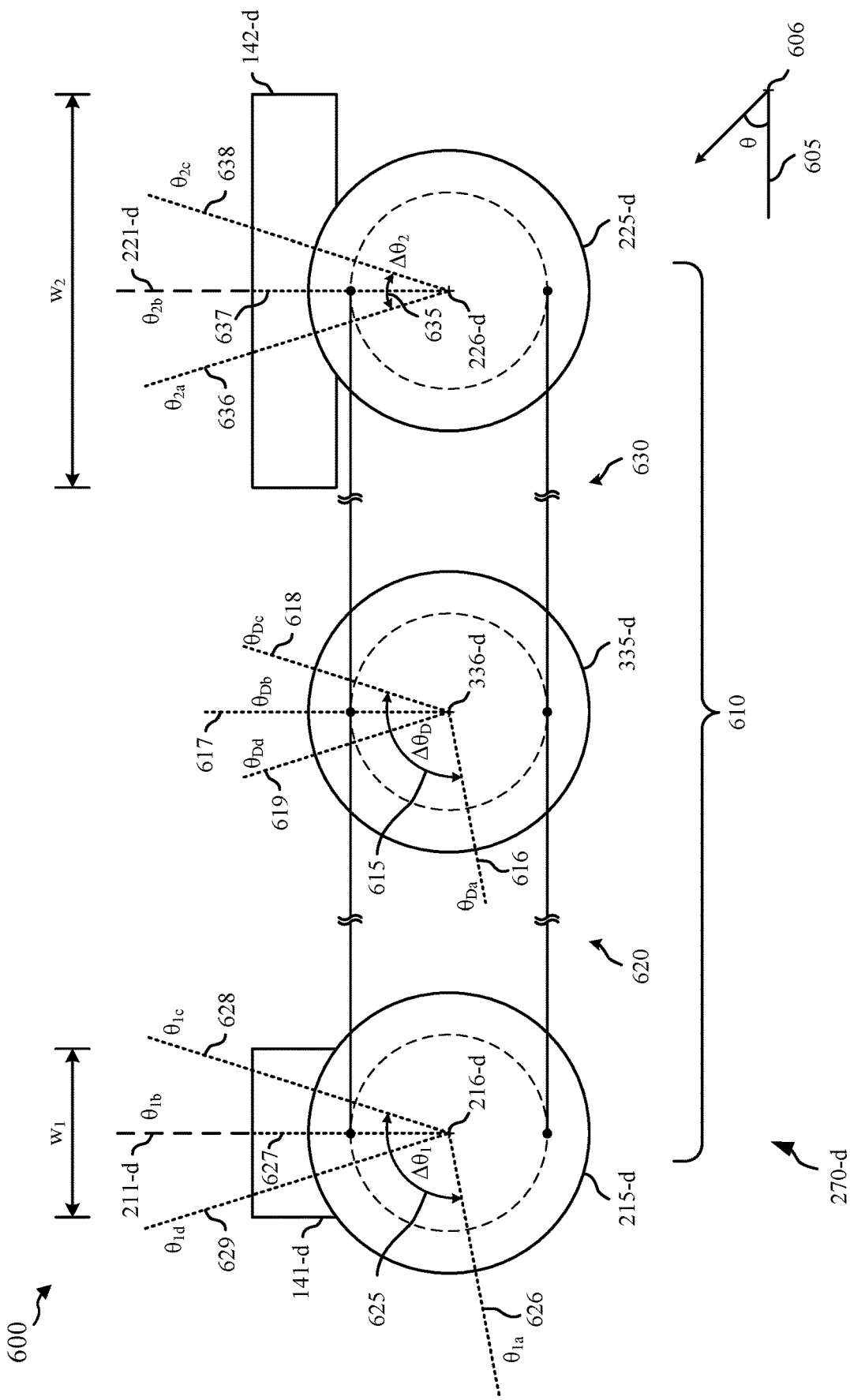
FIG. 6 shows a schematic view of a multiple-antenna positioner in accordance with various aspects of the present disclosure.

FIG. 6 shows a schematic view 600 of a multiple-antenna positioner 270-d in accordance with various aspects of the present disclosure. The multiple-antenna positioner 270-d includes a first spindle 215-d which is coupled with a first antenna 141-d and rotates about a first spindle axis 216-d, and a second spindle 225-d which is coupled with a second antenna 142-d and rotates about a second spindle axis 226-d. The first antenna 141-d may be associated with a first boresight 211-d, or an otherwise nominal or physical orientation, and the second antenna 142-d may be associated with a second boresight 221-d, or an otherwise nominal or physical orientation.

The multiple-antenna positioner 270-d further includes a third spindle 335-d, which rotates about a third spindle axis 336-d. The first spindle 215-d, the second spindle 225-d, and the third spindle 335-d can each be rotatably coupled, for example, to a spindle support structure (not shown) such as spindle support structure 265 described with reference to FIGS. 2A and 2B. In various examples the spindle support structure may provide fixed relative locations between any of the first spindle axis 216-d, the second spindle axis 226-d, and the third spindle axis 336-d, or may provide relative movement between any of the first spindle axis 216-d, the second spindle axis 226-d, and the third spindle axis 336-d by way of a compliant member or a kinematic linkage.

The third spindle 335-d may also be coupled with a drive element 440 (not shown). The drive element 440 may include any element suitable for rotating the third spindle 335-d, which in some examples may include a motor, a gearbox, or a combination thereof. The motor may be any motor suitable for providing a rotation of the third spindle 335-d, and the gearbox, where included in the drive element 440, may be any mechanism suitable for providing a mechanical ratio between the motor and the third spindle 335-d. In some alternative examples, a drive element 440 may drive the first spindle 215-d or the second spindle 225-d instead of the third spindle 335-d, which may support the third spindle 335-d being omitted from the multiple-antenna positioner 270-d.

As shown in the schematic view 600 of the illustrated example, the first spindle axis 216-d and the second spindle axis 226-d can be at a same height (e.g., relative to a base element 240) as the third spindle axis 336-d. In various other examples, one or more of the first spindle axis 216-d, the second spindle axis 226-d, or the third spindle axis 336-d can be at different heights. In other words, two or more of the first spindle axis 216-d, the second spindle axis 226-d, or the third spindle axis 336-d may be coplanar, or non-coplanar.

The first spindle axis 216-*d* and the second spindle axis 226-*d* may be configured such that they correspond to the same positioning degree of freedom. For example, each of the first spindle axis 216-*d* and the second spindle axis 226-*d* may be parallel to a reference plane 605. In some examples, the reference plane 605 may be ground plane or a nominally horizontal plane, such that the first spindle axis 216-*d* and the second spindle axis 226-*d* correspond to an elevation degree of freedom for the respective antennas 141-*d* and 142-*d* (e.g., for boresights 211-*d* and 221-*d*, respectively). Angles about the positioning degree of freedom may be measured as an angle, θ, relative to the reference plane 605. In some examples, such an angle may be measured about a positioning axis 606, which may also be parallel (e.g., coplanar) with the reference plane 605. In various examples, the first spindle axis 216-*d* or the second spindle axis 226-*d* may or may not be parallel to the illustrative positioning axis 606 while still being associated with the same positioning degree of freedom, such as when the first spindle axis 216-*d* and the second spindle axis 226-*d* are non-parallel with each other (e.g., oriented in different azimuth directions).

The first antenna 141-*d* and the second antenna 142-*d* may be configured with different physical characteristics, different beam characteristics, or various combinations thereof. For example, the first antenna 141-*d* may be associated with a first width, $w_1$, as measured along a direction perpendicular to the boresight 211-*d* and perpendicular to the first spindle axis 216-*d*. The second antenna 142-*d* may be associated with a second width, $w_2$, as measured along a direction perpendicular to the boresight 221-*d* and perpendicular to the second spindle axis 226-*d*. In some examples, $w_1$ and $w_2$ may refer to aperture dimensions (e.g., widths) of the respective antennas, which may support different beam characteristics of the different antennas. For example, when the antennas 141-*d* and 142-*d* are passive array antennas or phased array antennas that support a transmission or reception beam (e.g., passively or using various beamforming techniques), a beam width or beam roll-off characteristic (e.g., a change in gain relative to a spatial dimension) may be based at least in part on the corresponding aperture dimensions. A narrower aperture dimension may be associated with a broader (e.g., less focused) beam dimension in the corresponding direction, whereas a wider aperture dimension may be associated with a narrower (e.g., more focused) beam dimension in the corresponding direction. Thus, in some examples, the antenna 141-*d*, having a narrower aperture width, $w_1$, may be associated with a relatively broader beam (e.g., spanning a relatively wider range of elevation angles), whereas the antenna 142-*d*, having a wider aperture width, $w_2$, may be associated with a relatively narrower beam (e.g., spanning a relatively narrower range of elevation angles).

The illustrated aperture widths of the first antenna 141-*d* or the second antenna 142-*d* may be combined with other antenna dimensions to support various beam characteristics. For example, the first antenna 141-*d* may have an aperture length (e.g., a dimension parallel to the first spindle axis 216-*d*, a dimension perpendicular to the boresight 211-*d* and perpendicular to the aperture width, $w_1$) that is relatively long, which may be associated with a relatively narrower beam in the corresponding direction (e.g., spanning a relatively narrower range of azimuth angles). When combined with a relatively narrower aperture width, $w_1$, the first antenna 141-*d* may be associated with a beam having a relatively rectangular or elliptical cross-section. The second antenna 142-*d* may have an aperture length (e.g., a dimension parallel to the second spindle axis 226-*d*, a dimension perpendicular to the boresight 221-*d* and perpendicular to the aperture width, $w_2$) that is relatively short (e.g., compared to an aperture length of the first antenna 141-*d*), which may be associated with a relatively broader beam in the corresponding direction (e.g., spanning a relatively wider range of azimuth angles). In some examples, an aperture length of the second antenna 142-*d* may be equal to or nearly equal to the aperture width, $w_2$, which may be associated with a beam having a relatively square or circular cross-section (e.g., having the same or similar span in elevation and azimuth directions). In some examples, such a configuration may support the second antenna 142-*d* having a beam that is narrower in the elevation direction than a beam of the first antenna 141-*d*, and broader in the azimuth direction than the beam of the first antenna 141-*d*.

In some circumstances, a narrower beam of an antenna may support favorable communications characteristics. For example, narrower beams may focus transmission energy to or from a relatively smaller coverage area, such that a narrower beam (e.g., a narrower transmission beam, a narrower reception beam) may be associated with a higher signaling gain between the antenna and a target device or single directional alignment of transmission or reception. Further, a narrower beam having a steeper roll-off may support using higher transmission power in some circumstances. For example, some communications standards may impose limits to off-axis transmission power (e.g., transmission energy directed away from or otherwise not aligned with a target, transmission energy associated with sidelobes of a transmission beamforming pattern). A relatively broader beam profile may therefore be more limiting to peak transmission power (e.g., on-axis transmission power), whereas a relatively narrower beam profile may be able to implement a higher peak transmission power because the steeper roll-off away from an on-axis direction may support beam power falling below a limitation of off-axis transmission power or interference more sharply. Thus, for these and other reasons, it may be beneficial to include an antenna with relatively large aperture dimensions in some examples.

In some examples, however, packaging constraints may impose practical limitations on antenna aperture dimensions. For example, in a vehicle application (e.g., an airplane application) or other application where an antenna is oriented within a radome 145, the radome 145 may limit how large an antenna may be, or may physically limit a range of positioning of the antenna. To balance tradeoffs between aperture dimensions and antenna positioning limitations, the multiple-antenna positioner 270-*d* includes a mechanism 610 configured to rotate the different antennas 141-*d* and 142-*d*, in response to driving the third spindle 335-*d* over a positioning range (e.g., by driving a drive element 440 coupled with the third spindle 335-*d* over an actuation range), over different orientation ranges (e.g., about a positioning degree of freedom), such as different elevation ranges. By including different antennas, and configuring positioning of such antennas according to different orientation ranges, various tradeoffs can be handled more effectively than other techniques.

Regarding the actuation range of the multiple-antenna positioner 270-*d* (e.g., a positioning range of the third spindle 335-*d*, an actuation range of a drive element 440 coupled with the third spindle 335-*d*), the third spindle 335-*d* may be configured for actuation between an angle 616 (e.g., $θ_{Da}$, a minimum angle, a first rotation limit) and an angle 618 (e.g., $θ_{Dc}$, a maximum angle, a second rotation limit). Thus, an actuation range 615 of the third spindle 335-*d* or associated drive element 440 may be given by $Δθ_D = θ_{Dc} -$ $\theta_{Da}$. Over the actuation range 615, the mechanism 610 may be configured to rotate the first antenna 141-d and the second antenna 142-d over different ranges about a positioning degree of freedom (e.g., different elevation ranges) according to various techniques.

Regarding the range of positioning of the first antenna 141-d (e.g., a range of positioning the boresight 211-d or other nominal or physical orientation of the first antenna 141-d), the first spindle 215-d may be configured to be actuated between an angle 626 (e.g., $\theta_{1a}$, a minimum angle, a first rotation limit) and an angle 628 (e.g., $\theta_{1c}$, a maximum angle, a second rotation limit). Thus, an orientation range 625 of the first spindle 215-d or the antenna 141-d (e.g., the boresight 211-d) may be given by $\Delta\theta_1 = \theta_{1c} - \theta_{1a}$. The range of angles of the orientation range 625 may include a range from 0° to 90°, a range from 0° to 125°, a range from −15° to 135°, or various other ranges (e.g., of elevation). In some examples, the orientation range 625 may be configured to support communications over any elevation angle supported by an antenna system that includes the multiple-antenna positioner 270-d. Rotation of the first spindle 215-d through the orientation range 625 may be provided via a rotation of the third spindle 335-d through the actuation range 615, or some portion thereof, and a linkage 620 (e.g., of the mechanism 610) between the first spindle 215-d and the third spindle 335-d.

In some examples, the orientation range 625 and the actuation range 615 may be equal (e.g., a 1:1 actuation ratio, where $\theta_{Da} = \theta_{1a}$ and $\theta_{Dc} = \theta_{1c}$). Such a configuration may be supported by the linkage 620 including one or more rigid link arms (e.g., link arms 330 described with reference to FIGS. 3A through 5), or by the linkage 620 including gears having the same pitch diameters (e.g., the first spindle 215-d and the third spindle 335-d being gears having the same pitch diameters, each meshed with an idler gear or pinion of the linkage 620), or by the linkage 620 including pulleys having the same pitch diameters (e.g., the first spindle 215-d and the third spindle 335-d being pulleys coupled via a belt or chain), or by other techniques. In some examples, the first spindle 215-d and the third spindle 335-d may be directly meshed gears, in which case the interpretation of angle 616 as a minimum angle and angle 618 as a maximum angle may be swapped, as the first spindle 215-d and the third spindle 335-d may rotate in opposite directions.

In some examples, the orientation range 625 and the actuation range 615 may be different (e.g., a 1:n actuation ratio, where $\theta_{Da} \neq \theta_{1a}$ or $\theta_{Dc} \neq \theta_{1c}$). Such a configuration may be supported by the linkage 620 including gears having different pitch diameters (e.g., the first spindle 215-d and the third spindle 335-d being gears having different pitch diameters, meshed with each other or meshed with an idler gear or pinion of the linkage 620), or by the linkage 620 having pulleys having different pitch diameters (e.g., the first spindle 215-d and the third spindle 335-d being pulleys coupled via a belt or chain), or by having a gear reduction or drivetrain between the first spindle 215-d and the antenna 141-d, or some other means of providing a first actuation ratio between the first spindle 215-d and the third spindle 335-d.

In some examples, the first spindle 215-d being oriented at the angle 626 may correspond to or coincide with the third spindle 335-d being oriented at the angle 616. In some examples, the first spindle 215-d being oriented at the angle 628 may correspond to or coincide with the third spindle 335-d being oriented at the angle 618. In other words, in various examples, the first spindle 215-d and the third spindle 335-d may reach one or both of their respective minimum and maximum angles concurrently, which may be associated with a direct or continuous coupling between the first spindle 215-d and the third spindle 335-d.

Regarding the range of positioning of the second antenna 142-d (e.g., a range of positioning the boresight 221-d or other nominal or physical orientation of the second antenna 142-d), the second spindle 225-d may be configured to be actuated between an angle 636 (e.g., $\theta_{2a}$, a minimum angle, a first rotation limit) and an angle 638 (e.g., $\theta_{2c}$, a maximum angle, a second rotation limit). Thus, an orientation range 635 of the second spindle 225-d or the antenna 142-d (e.g., the boresight 221-d) may be given by $\Delta\theta_2 = \theta_{2c} - \theta_{2a}$. According to various examples, the orientation range 635 may be different than the orientation range 625. For example, as shown in the multiple-antenna positioner 270-d, the orientation range 635 can be smaller than the orientation range 625, such that at least a portion of the orientation range 625 does not overlap with the orientation range 635 (e.g., including a range of orientations exclusive to the antenna 141-d or the boresight 211-d). In some examples, the angles of the orientation range 625 may include all or a portion of the angles of the orientation range 635 (e.g., according to an overlapping portion of angles where both the boresight 211-d and the boresight 221-d may be oriented). The range of angles of the orientation range 635 may include a range from 55° to 90°, a range from 55° to 125°, a range from 45° to 135°, or various other ranges (e.g., of elevation). In some examples, the orientation range 625 may be configured to support communications over some portion or subset of elevation angles supported by an antenna system that includes the multiple-antenna positioner 270-d. Rotation of the second spindle 225-d through the orientation range 635 may be provided via a rotation of the third spindle 335-d through the actuation range 615, or some portion thereof, and a linkage 630 (e.g., of the mechanism 610) between the second spindle 225-d and the third spindle 335-d. In various examples, the linkage 630 may include gears (e.g., where the second spindle 225-d and the third spindle 335-d are directly meshed gears or meshed via an idler gear), a belt or chain, link arms, or other coupling components that provide an actuation ratio or mechanical idling in accordance with the described techniques.

In some examples, the second spindle 225-d being oriented at the angle 638 may correspond to or coincide with the third spindle 335-d being oriented at the angle 618. In other words, the second spindle 225-d and the third spindle 335-d may reach maximum angles concurrently. Alternatively, the second spindle 225-d and the third spindle 335-d may not reach maximum angles concurrently.

In some examples, the second spindle 225-d being oriented at the angle 636 may correspond to or coincide with the third spindle 335-d being oriented at the angle 616. In other words, the second spindle 225-d and the third spindle 335-d may also reach minimum angles concurrently. In cases where the orientation range 625 is different than the orientation range 635, such a configuration may be supported by an actuation ratio between the second spindle 225-d and the third spindle 335-d (e.g., between a drive element 440 and the boresight 221-d) being different than an actuation ratio between the first spindle 215-d and the third spindle 335-d (e.g., between the drive element 440 and the boresight 211-d). Such a configuration may be supported by the linkage 630 including a gear having a different pitch diameter than a gear of the linkage 620 (e.g., the first spindle 215-d and the second spindle 225-d being gears having different pitch diameters), or by the linkage 630 including a pulley having a different pitch diameter than a pulley of the linkage 620 (e.g., the first spindle 215-*d* and the second spindle 225-*d* being pulleys with different diameters, each coupled with the third spindle via a belt or chain), or by having a gear reduction or drivetrain between the first spindle 215-*d* and the antenna 141-*d* or between the second spindle 225-*d* and the antenna 142-*d*, or by some other means of providing a first actuation ratio between the first spindle 215-*d* and the third spindle 335-*d* and a second actuation ratio, different than the first actuation ratio, between the second spindle 225-*d* and the third spindle 335-*d*. As a result of the different actuation ratios, over at least a portion of the actuation range 615, the first spindle 215-*d* (e.g., the boresight 211-*d*) may be oriented in a different direction than the second spindle 225-*d* (e.g., the boresight 221-*d*). However, at one rotational position of the third spindle 335-*d*, both the first antenna 141-*d* and the second antenna 142-*d* may be positioned in a same orientation (e.g., at $\theta_{1b}=\theta_{2b}$, an overhead position), which may facilitate handover of communications or other selection between the antennas at that position of the third spindle 335-*d*.

In some examples, the second spindle 225-*d* being oriented at the angle 636 may correspond to or coincide with the third spindle 335-*d* being oriented at the angle 619 (e.g., an angle between a minimum actuation angle and a maximum actuation angle). In other words, the second spindle 225-*d* and the third spindle 335-*d* may not reach minimum angles concurrently, which may be associated with a portion of the actuation range 615 (e.g., a portion between angle 619 and angle 616) including a suppression of rotation of the second spindle 225-*d* or an idling of the second spindle 225-*d* (e.g., by the mechanism 610, by the linkage 630). For example, one or both of the angle 636 or the angle 619 may be associated with a travel stop of the second spindle 225-*d* (e.g., of the antenna 142-*d*). In a range of actuation of the third spindle 335-*d*, between angle 616 and 619, the second spindle 225-*d* may be engaged with the travel stop (e.g., where the second spindle is positioned or maintained at the angle 636). In another example, one or both of the angle 636 or the angle 619 may be associated with a mechanical clutch or solenoid associated with rotation of the second spindle 225-*d* (e.g., of the antenna 142-*d*). In a range of actuation of the third spindle 335-*d*, between angle 616 and 619, the mechanical clutch or solenoid may be disengaged (e.g., to maintain the second spindle 225-*d* at the angle 636). In a range of actuation of the third spindle 335-*d*, between angle 619 and 618, the second spindle 225-*d* may be positioned over the orientation range 635 from angle 636 to angle 638 (e.g., disengaged from the travel stop, positioned with a mechanical clutch or solenoid being engaged). In various examples, such a configuration may be supported by an actuation ratio between the second spindle 225-*d* and the third spindle 335-*d* (e.g., between a drive element 440 and the boresight 221-*d*) that is equal to or different than an actuation ratio between the first spindle 215-*d* and the third spindle 335-*d* (.g., between the drive element 440 and the boresight 211-*d*).

The configuration of the mechanism 610 may support positioning the first antenna 141-*d* and the second antenna 142-*d* using a common drive element 440 (e.g., via the third spindle 335-*d*), while also supporting the second antenna 142-*d* having a larger aperture dimension within a radome 145 or other enclosure, or to accommodate other physical constraints associated with the relatively larger size of the second antenna 142-*d*. According to these and other considerations, the mechanism 610 may be advantageously included in or configured for the multiple-antenna positioner 270-*d* to support various techniques for orienting multiple antennas having different characteristics using a common drive element 440.

In some examples, the mechanism 610 may be configured for the antenna 141-*d* and the antenna 142-*d* (e.g., the boresight 211-*d* and the boresight 221-*d*) to have a common orientation for at least a single orientation of the third spindle 335-*d*. When the first antenna 141-*d* and the second antenna 142-*d* have a common orientation (e.g., a common elevation angle), both the first antenna 141-*d* and the second antenna 142-*d* may be aligned with a common target. Such a configuration may be used to support a dynamic selection or handoff of communications between the first antenna 141-*d* and the second antenna 142-*d*.

For example, when the third spindle 335-*d* is oriented at an angle 619 (e.g., $\theta_{Dd}$), the first spindle 215-*d* may be oriented at an angle 629 (e.g., $\theta_{1d}$, which may not be associated with a boundary or limit of the orientation range 625) and the second spindle 225-*d* may be oriented at an angle 636 (e.g., $\theta_{2a}$, which may be associated with a boundary or limit of the orientation range 635). In some examples, a common orientation of the antenna 141-*d* and the antenna 142-*d* may not be at a boundary of either the orientation range 625 or the orientation range 635, such as when the first spindle 215-*d* is oriented at angle 627 and the second spindle 225-*d* is oriented at angle 637, which may correspond to an overhead position (e.g., a 90 degree elevation).

In some examples, a common orientation may correspond to a travel stop of one or both of the first antenna 141-*d* or the second antenna 142-*d*. In the multiple-antenna positioner 270-*d*, for example, the angle 636 may correspond to a minimum angle of the second antenna 142-*d*, which may correspond to a position of a travel stop in the linkage 630. In other examples (not shown), the angle 628 may correspond to a travel stop of the linkage 620, or other limitation or orientation boundary of the orientation range 625. When a maximum angle of the orientation range 625 is equal to a minimum angle of the orientation range 635, the orientation range 625 and the orientation range 635 may share only a single point of common orientation, and accordingly may not overlap over a range about the positioning degree of freedom (e.g., not overlap over a range of elevation angles).

In some examples, the mechanism 610 may be configured for the antenna 141-*d* and the antenna 142-*d* (e.g., the boresight 211-*d* and the boresight 221-*d*) to have common orientations over a range of orientations of the third spindle 335-*d*. For example, over the portion of actuation range 615 between angle 619 and angle 618, the second spindle 225-*d* may be oriented over the full orientation range 635 between angle 636 and 638 (e.g., where $\theta_{2a}=\theta_{Dd}$ and $\theta_{2c}=\theta_{Dc}$) and the first spindle 215-*d* may be oriented over a portion of the orientation range 655 between angle 639 and 638 (e.g., where $\theta_{1d}=\theta_{Dd}$ and $\theta_{1c}=\theta_{Dc}$). When the first antenna 141-*d* and the second antenna 142-*d* have common orientations (e.g., a common elevation angle) over such ranges, such a configuration may be used to support a dynamic selection or handoff of communications between the first antenna 141-*d* and the second antenna 142-*d* (e.g., over the portion of actuation range 615 between angle 619 and angle 618, where the orientation range 635 overlaps in angle with the portion of the orientation range 625 between angle 629 and angle 628).

FIGS. 7A through 7D show schematic views of different states of a multiple-antenna positioner 270-*e* in accordance with various aspects of the present disclosure. The multiple-antenna positioner 270-*e* includes a first spindle 215-*e* which is coupled with a first antenna 141-*e* having a boresight 211-*e*, and a second spindle 225-*e* which is coupled with a second antenna 142-*e* having a boresight 221-*e*. The multiple-antenna positioner 270-*e* further includes a third spindle 335-*e*, which may be coupled with a drive element 440 (not shown). The first spindle 215-*e*, the second spindle 225-*e*, and the third spindle 335-*e* can all be rotatably coupled, for example, to a spindle support structure such as spindle support structure 265 described with reference to FIGS. 2A and 2B (not shown). The multiple-antenna positioner 270-*e* also includes a mechanism 610-*a* configured to rotate the different antennas 141-*e* and 142-*e*, or boresights 211-*e* and 221-*e*, over different orientation ranges in response to driving the third spindle 335-*e* over an actuation range.

In the example of multiple-antenna positioner 270-*e*, the mechanism 610-*a* includes a first linkage 620-*a* including link arms 330-*e*-1 and 330-*e*-2 (e.g., rigid link arms). Thus, the linkage 620-*a* may provide a continuous 1:1 actuation ratio between the third spindle 335-*e* and the first spindle 215-*e* over the actuation range of the third spindle 335-*e* (e.g., of the drive element 440 coupled with the third spindle 335-*e*, of an actuation range 615). The link arms 330-*e*-1 and 330-*e*-2 may be an example of link arms 330 described herein, and may include a turnbuckle or other mechanism configured to reduce a degree of backlash between the components of the multiple-antenna positioner 270-*e* (e.g., between the first spindle 215-*e* and the third spindle 335-*e*).

In the example of multiple-antenna positioner 270-*e*, the mechanism 610-*a* also includes a second linkage 630-*b* including linear bearings 710-*a*-1 and 710-*a*-2. Each linear bearing may include a first portion 711-*a* engaged with or in a second portion 712-*a*. Although the second linkage 630-*b* is illustrated with two linear bearings 710-*a*, in some examples, a second linkage 630-*b* may include one linear bearing 710. A linear bearing 710 may be a piston, an air cylinder, a slide bearing, or other device providing at least some amount of a linear degree of freedom between respective coupling locations on the third spindle 335-*e* and the second spindle 225-*e*. A linear bearing 710 may also include at least one travel stop (e.g., limiting a degree of linear excursion, compression, or extension of the linear bearing 710). In some examples, the mechanism 610-*a* or the second linkage 630-*a* may include a travel stop 720 for the second spindle 225-*e*, which may include a first feature 721 fixed to the second spindle 225-*e* and a second feature 722 fixed to a spindle support structure 265 (not shown). Contact between the first feature 721 and the second feature 722 may limit or suppress rotation of the second spindle 225-*e*, which may prevent the antenna 142-*e* from hitting a radome or other component. Although a single travel stop 720 is shown, a second travel stop 720 may be included to suppress or limit rotation of the second spindle 225-*e* in an opposite rotational direction.

In some examples, the second linkage 630-*a* may also include a spring element 730 (e.g., a torsional spring, a clock spring) configured for preloading various components, such as preloading the first feature 721 into the second feature 722 or preloading a first portion 711-*a* of a linear bearing 710-*a* into a second portion 712-*a* of the linear bearing 710-*a* (e.g., at a travel stop of the linear bearing 710-*a*). Although illustrated with a spring element 730, in some examples, a spring element 730 may be omitted. For example, a spring force or preload may be provided by one or more linear bearings 710, such as when the linear bearing 710 is configured with a linear spring (e.g., a coil spring) or a gas charge (e.g., where the linear bearing 710 may be an air spring or damper element).

Figure 7A:
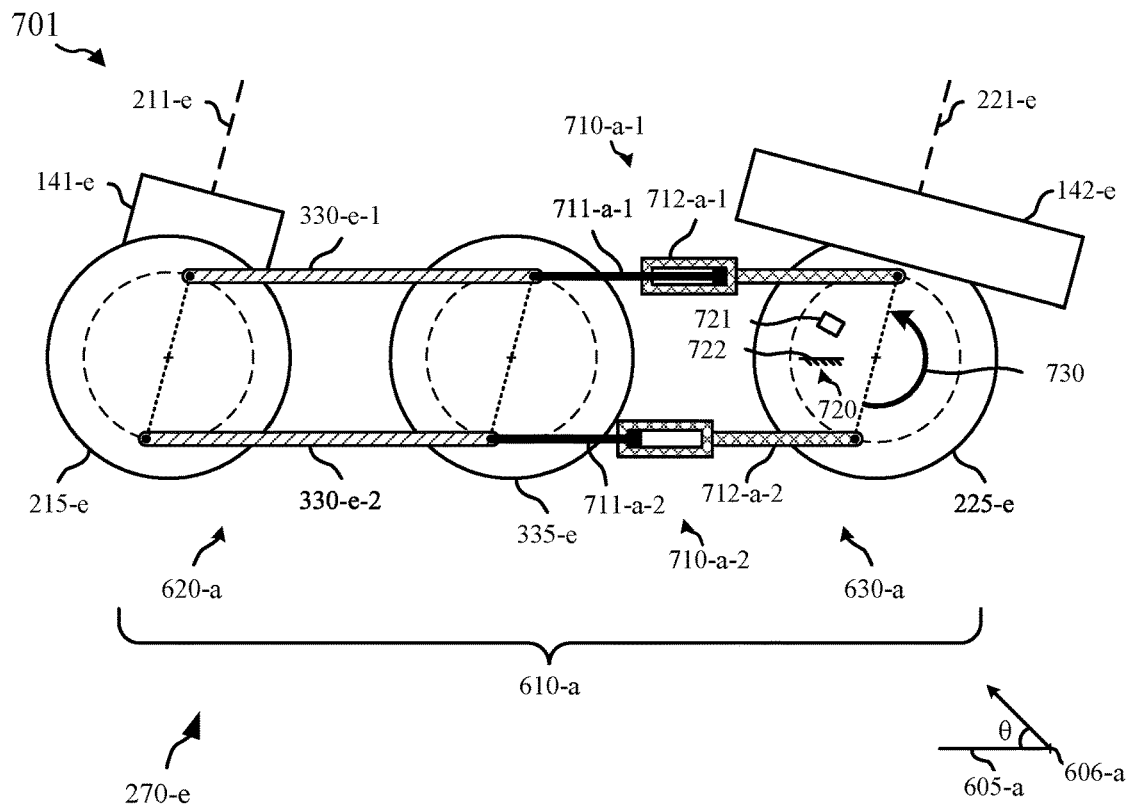
FIGS. 7A through 7D show schematic views of a multiple-antenna positioner in accordance with various aspects of the present disclosure.

FIG. 7A illustrates a schematic view of a first state 701 of the multiple-antenna positioner 270-*e*. The first state 701 may correspond to a condition where each of the first spindle 215-*e*, the second spindle 225-*e*, and the third spindle 335-*e* are at a maximum angle (e.g., a maximum elevation angle). For example, the third spindle 335-*e* may be actuated to an angle 618 (e.g., $\theta_{Dc}$) described with reference to FIG. 6, which may correspond to the first spindle 215-*e* being oriented at an angle 628 (e.g., $\theta_{1c}$) and the second spindle 225-*e* being oriented at an angle 638 (e.g., $\theta_{2c}$). In the first state 701, the first feature 721 and the second feature 722 of the travel stop 720 may be disengaged or decoupled, and the spring element 730 may provide a preload into one or both of the linear bearings 710-*a*. For example, the spring element 730 may load the linear bearing 710-*a*-1 into a compressive travel stop of the linear bearing 710-*a*-1, or the spring element 730 may load the linear bearing 710-*a*-2 into an extensive travel stop of the linear bearing 710-*a*-2, or both.

Figure 7B:
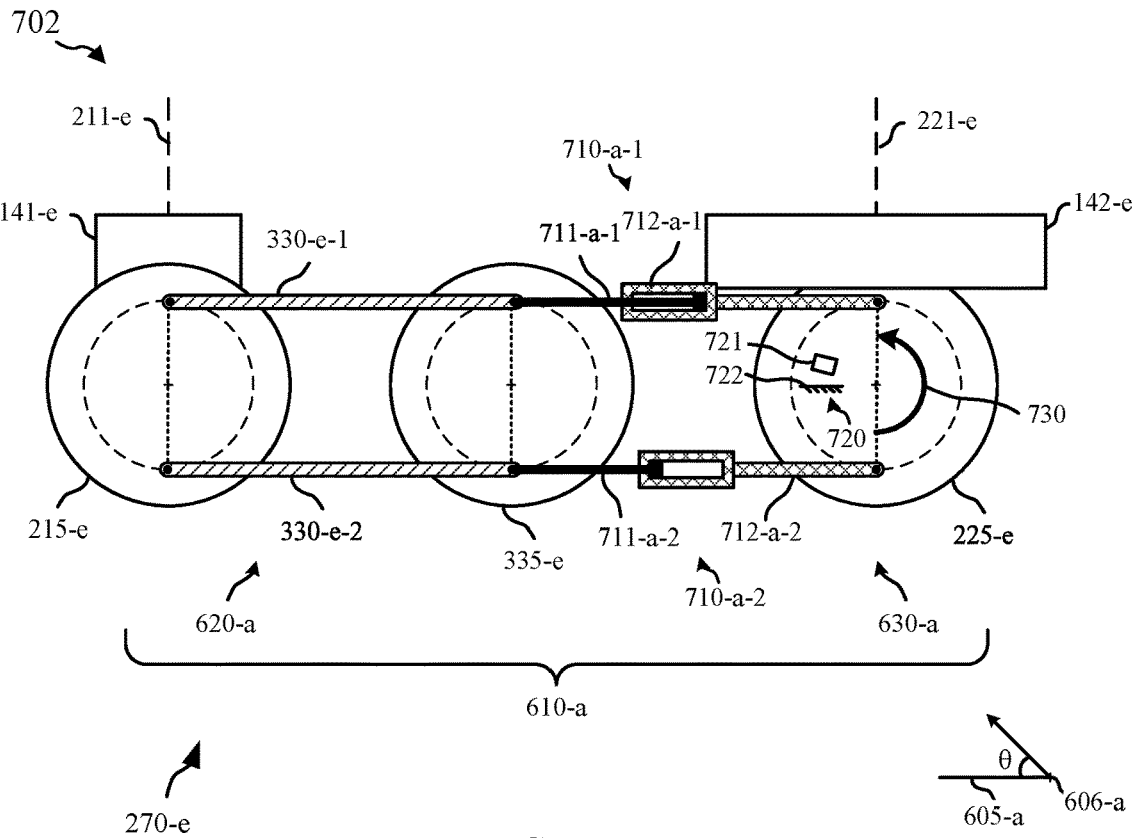

FIG. 7B illustrates a schematic view of a second state 702 of the multiple-antenna positioner 270-*e*. The second state 702 may correspond to a condition where each of the first spindle 215-*e*, the second spindle 225-*e*, and the third spindle 335-*e* are at an intermediate angle (e.g., between minimum and maximum elevation angles). For example, the third spindle 335-*e* may be actuated to an angle 617 (e.g., $\theta_{Db}$) described with reference to FIG. 6, which may correspond to the first spindle 215-*e* being oriented at an angle 627 (e.g., $\theta_{1b}$) and the second spindle 225-*e* being oriented at an angle 637 (e.g., $\theta_{2b}$). In the second state 702, the first feature 721 and the second feature 722 of the travel stop 720 may remain disengaged or decoupled, and the spring element 730 may continue to provide a preload into one or both of the linear bearings 710-*a*. Between the first state 701 and second state 702 the linear bearings 710-*a* may behave as relatively rigid links or coupling, supporting a 1:1 actuation ratio between the third spindle 335-*e* and the second spindle 225-*e* over such an actuation range. In some examples, through actuation between the first state 701 and the second state 702, the orientation (e.g., elevation orientation) of the boresight 211-*e* may be equal to or substantially equal to the orientation of the boresight 221-*e*, which may support a dynamic selection between the first antenna 141-*e* and the second antenna 142-*e* for communications (e.g., according to a particular antenna or beam characteristic).

Figure 7C:
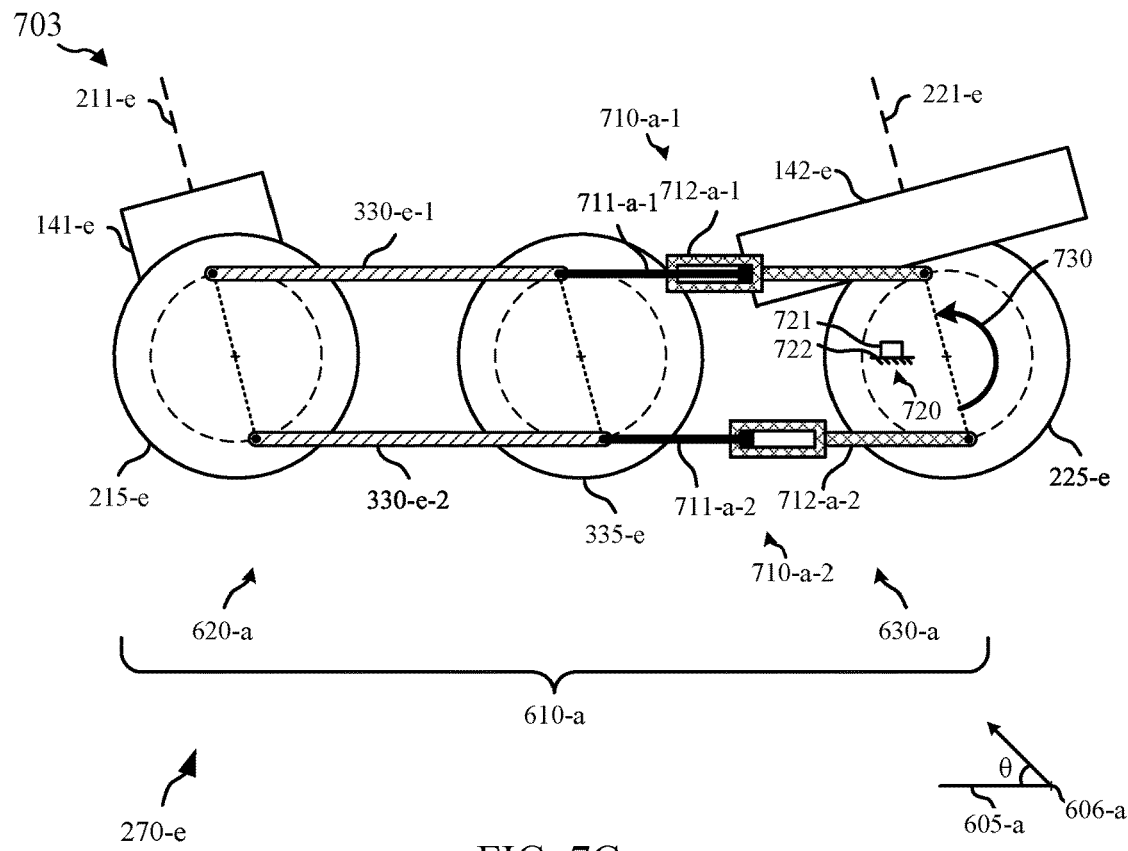

FIG. 7C illustrates a schematic view of a third state 703 of the multiple-antenna positioner 270-*e*. The third state 703 may correspond to a condition where the first spindle 215-*e* is at a minimum angle, and the second spindle 225-*e* and the third spindle 335-*e* are at an intermediate angle (e.g., between minimum and maximum elevation angles). For example, the third spindle 335-*e* may be actuated to an angle 619 (e.g., $\theta_{Dd}$) described with reference to FIG. 6, which may correspond to the first spindle 215-*e* being oriented at an angle 629 (e.g., $\theta_{1d}$) and the second spindle 225-*e* being oriented at an angle 636 (e.g., $\theta_{2a}$). At the third state 703, the first feature 721 and the second feature 722 of a travel stop 720 may become engaged or coupled, and the spring element 730 may transition from providing a preload into one or both of the linear bearings 710-*a* to providing a preload between the first feature 721 and the second feature 722 of the travel stop 720. Between the second state 702 and the third state 703 the linear bearings 710-*a* may behave as relatively rigid links or coupling, supporting a 1:1 actuation ratio between the third spindle 335-e and the second spindle 225-e over such an actuation range. In some examples, through actuation between the second state 702 and the third state 703, the orientation (e.g., elevation orientation) of the boresight 211-e may be equal to or substantially equal to the orientation of the boresight 221-e, which may support a dynamic selection between the first antenna 141-e and the second antenna 142-e for communications (e.g., according to a particular antenna or beam characteristic). The third state 703 may illustrate a boundary of orienting the second spindle 225-d (e.g., corresponding to the travel stop 720 of the second spindle 225-d, corresponding to a compressive travel stop of the linear bearing 710-a-1, corresponding to an extensive travel stop of the linear bearing 710-a-2).

Figure 7D:
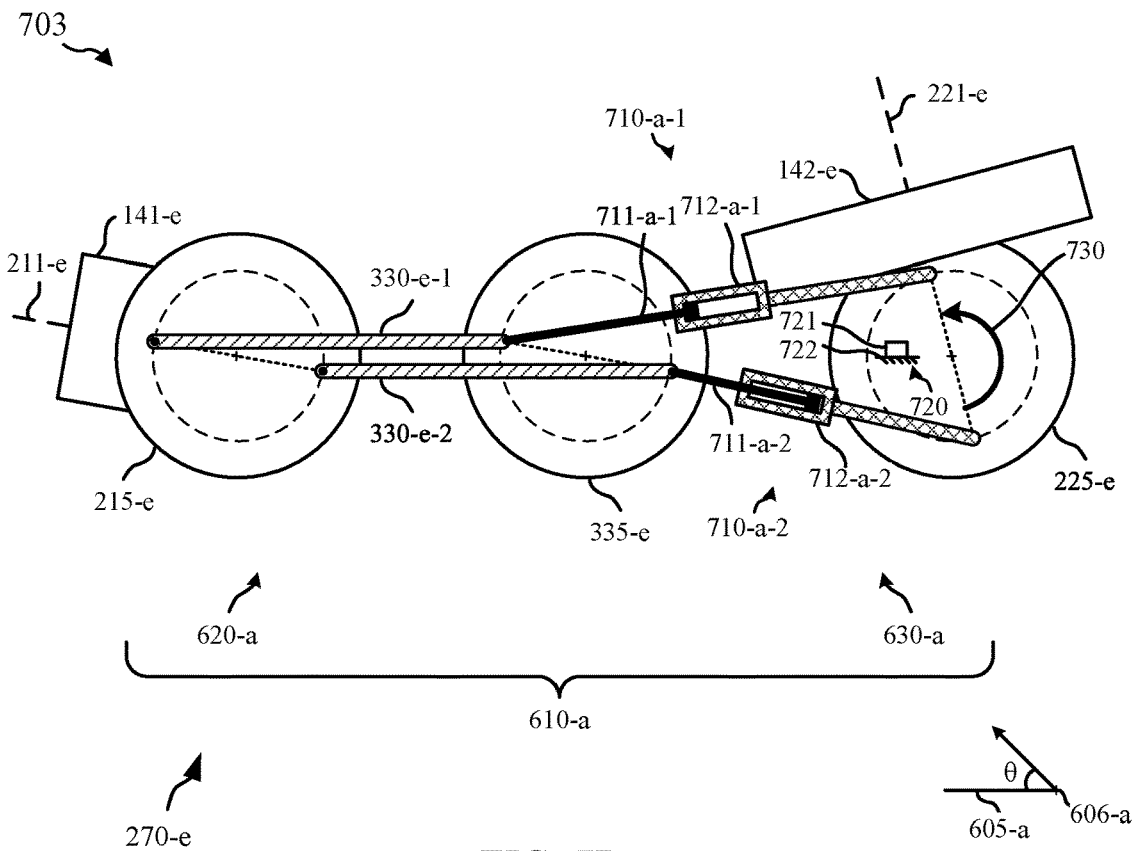

FIG. 7D illustrates a schematic view of a fourth state 704 of the multiple-antenna positioner 270-e. The fourth state 704 may correspond to a condition where the first spindle 215-e, the second spindle 225-e, and the third spindle 335-e are each at a minimum angle (e.g., a minimum elevation angle). For example, the third spindle 335-e may be actuated to an angle 616 (e.g., $\theta_{Da}$) described with reference to FIG. 6, which may correspond to the first spindle 215-e being oriented at an angle 626 (e.g., $\theta_{1a}$) and the second spindle 225-e remaining oriented at an angle 636 (e.g., $\theta_{2a}$). At the fourth state 704, the first feature 721 and the second feature 722 of a travel stop 720 may remain engaged or coupled, and the spring element 730 may continue to provide a preload between the first feature 721 and the second feature 722 of the travel stop 720. Between the second state 702 and the third state 703 the linear bearings 710-a may be effectively disengaged (e.g., from compressive or extensive travel stops), such that a respective first portion 711-a may slide freely relative to a respective second portion 712-a. Thus, an actuation range between the third state 703 and the fourth state 704 may represent a range of non-overlap of the positioning range of the first antenna 141-e and the second antenna 142-e.

In some examples, at the fourth state 704, one or both of the linear bearings 710-a may engage respective second travel stops (e.g., an extensive travel stop of the linear bearing 710-a-1, a compressive travel stop of the linear bearing 710-a-2), which may suppress further rotation of the third spindle 335-e or the first spindle 215-e. In some examples, through actuation between the third state 703 and the fourth state 704, the orientation (e.g., elevation orientation) of the boresight 211-e may change while the orientation of the boresight 221-e is maintained. By suppressing rotation of the second antenna 142-e between the third state 703 and the fourth state 704 (e.g., mechanically idling the second spindle 225-e while actuating the third spindle 335-e), a physical envelope for positioning the second antenna 142-e may be reduced, supporting a relatively smaller radome or other packaging constraint associated with the relatively larger aperture of the second antenna 142-e, while also supporting the first antenna 141-e and the second antenna 142-e being positioned with a common drive element 440.

FIGS. 8A through 8D show schematic views of different states of a multiple-antenna positioner 270-f in accordance with various aspects of the present disclosure. The multiple-antenna positioner 270-f includes a first spindle 215-f which is coupled with a first antenna 141-f having a boresight 211-f, and a second spindle 225-f which is coupled with a second antenna 142-f having a boresight 221-f. The multiple-antenna positioner 270-f further includes a third spindle 335-f, which may be coupled with a drive element 440 (not shown). The first spindle 215-f, the second spindle 225-f, and the third spindle 335-f can all be rotatably coupled, for example, to a spindle support structure such as spindle support structure 265 described with reference to FIGS. 2A and 2B (not shown). The multiple-antenna positioner 270-f also includes a mechanism 610-b configured to rotate the different antennas 141-f and 142-f, or boresights 211-f and 221-f, over different orientation ranges in response to driving the third spindle 335-f over an actuation range.

In the example of multiple-antenna positioner 270-f, the mechanism 610-b includes a first linkage 620-b including link arms 330-f-1 and 330-f-2 (e.g., rigid link arms). Thus, the linkage 620-b may provide a continuous 1:1 actuation ratio between the third spindle 335-f and the first spindle 215-f over the actuation range of the third spindle 335-f (e.g., of the drive element 440 coupled with the third spindle 335-f, of an actuation range 615). The link arms 330-f-1 and 330-f-2 may be an example of link arms 330 described herein, and may include a turnbuckle or other mechanism configured to reduce a degree of backlash between the components of the multiple-antenna positioner 270-f (e.g., between the first spindle 215-f and the third spindle 335-f).

In the example of multiple-antenna positioner 270-f, the mechanism 610-b includes a second linkage 630-b including link arms 330-f-3 and 330-f-4 (e.g., rigid link arms), coupled with the third spindle 335-f (e.g., with a pin connection) and engaged in slots 810-a-1 and 810-a-2, respectively, of the second spindle 225-f. Thus, the linkage 620-b may provide a discontinuous 1:1 actuation ratio between the third spindle 335-f and the second spindle 225-f over the actuation range of the third spindle 335-f (e.g., of the drive element 440 coupled with the third spindle 335-f, of an actuation range 615). In other words, over a first portion of an actuation range, the linkage 620-b may provide actuation of the second spindle 225-f, and over a second portion of the actuation range, the second spindle 225-f may be idled or decoupled from the third spindle 335-f.

In some examples, the mechanism 610-b or the second linkage 630-b may include a travel stop 820 for the second spindle 225-f, which may include a first feature 821 fixed to the second spindle 225-f and a second feature 822 fixed to a spindle support structure 265 (not shown). Contact between the first feature 821 and the second feature 822 may limit or suppress rotation of the second spindle 225-f, which may prevent the antenna 142-f from hitting a radome or other component. Although a single travel stop 820 is shown, a second travel stop 820 may be included to suppress or limit rotation of the second spindle 225-f in an opposite rotational direction. In some examples, the second linkage 630-b may also include a spring element 830 (e.g., a torsional spring, a clock spring) configured for preloading various components, such as preloading the first feature 821 into the second feature 822, or preloading a pin of the link arm 330-f-3 into a travel stop or end of the slot 810-a-1, or preloading a pin of the link arm 330-f-4 into a travel stop or end of the slot 810-a-2, or any combination thereof.

Figure 8A:
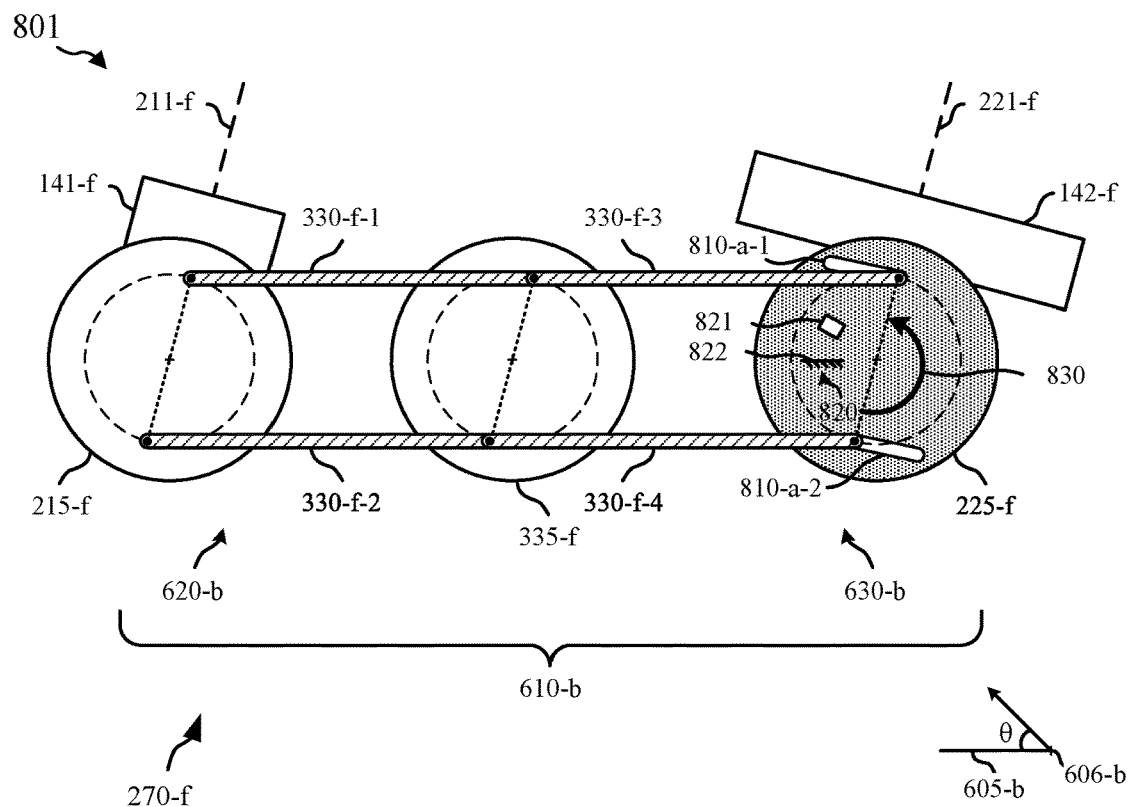
FIGS. 8A through 8D show schematic views of a multiple-antenna positioner in accordance with various aspects of the present disclosure.

FIG. 8A illustrates a schematic view of a first state 801 of the multiple-antenna positioner 270-f. The first state 801 may correspond to a condition where each of the first spindle 215-f, the second spindle 225-f, and the third spindle 335-f are at a maximum angle (e.g., a maximum elevation angle). For example, the third spindle 335-f may be actuated to an angle 618 (e.g., $\theta_{Dc}$) described with reference to FIG. 6, which may correspond to the first spindle 215-f being oriented at an angle 628 (e.g., $\theta_{1c}$) and the second spindle 225-f being oriented at an angle 638 (e.g., $\theta_{2c}$). In the first state 801, the first feature 821 and the second feature 822 of the travel stop 820 may be disengaged or decoupled, and the spring element 830 may provide a preload of the link arm 330-*f*-3 into an end of the slot 810-*a*-1, or a preload of the link arm 330-*f*-4 into an end of the slot 810-*a*-2, or both.

Figure 8B:
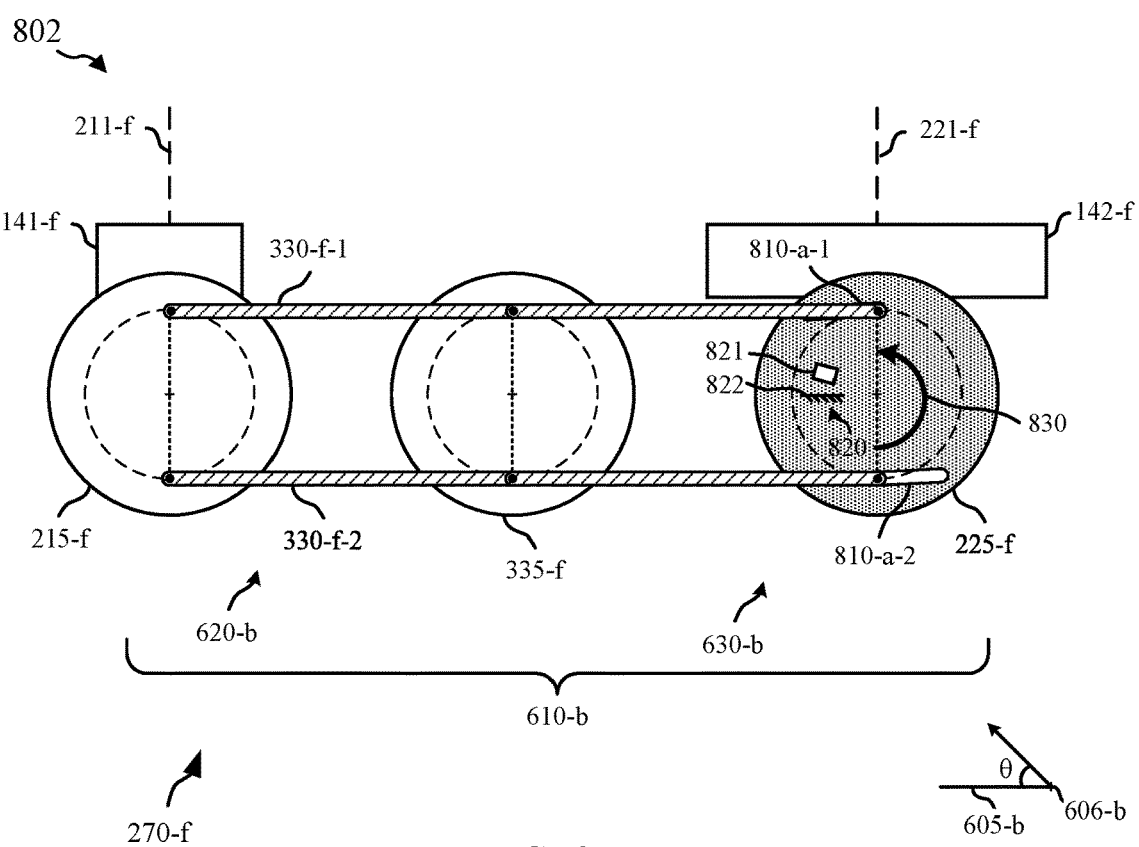

FIG. 8B illustrates a schematic view of a second state 802 of the multiple-antenna positioner 270-*f* The second state 802 may correspond to a condition where each of the first spindle 215-*f*, the second spindle 225-*f*, and the third spindle 335-*f* are at an intermediate angle (e.g., between minimum and maximum elevation angles). For example, the third spindle 335-*f* may be actuated to an angle 618 (e.g., $\theta_{Db}$) described with reference to FIG. 6, which may correspond to the first spindle 215-*f* being oriented at an angle 628 (e.g., $\theta_{1b}$) and the second spindle 225-*f* being oriented at an angle 638 (e.g., $\theta_{2b}$). In the second state 802, the first feature 821 and the second feature 822 of the travel stop 820 may remain disengaged or decoupled, and the spring element 830 may continue to preload the link arm 330-*f*-3 into an end of the slot 810-*a*-1, or preload the link arm 330-*f*-4 into an end of the slot 810-*a*-2, or both. Between the first state 801 and second state 802 the link arms 330-*f*-3 and 330-*f*-4 may behave as relatively rigidly coupled with the second spindle 225-*f*, supporting a 1:1 actuation ratio between the third spindle 335-*f* and the second spindle 225-*f* over such an actuation range. In some examples, through actuation between the first state 801 and the second state 802, the orientation (e.g., elevation orientation) of the boresight 211-*f* may be equal to or substantially equal to the orientation of the boresight 221-*f*, which may support a dynamic selection between the first antenna 141-*f* and the second antenna 142-*f* for communications (e.g., according to a particular antenna or beam characteristic).

Figure 8C:
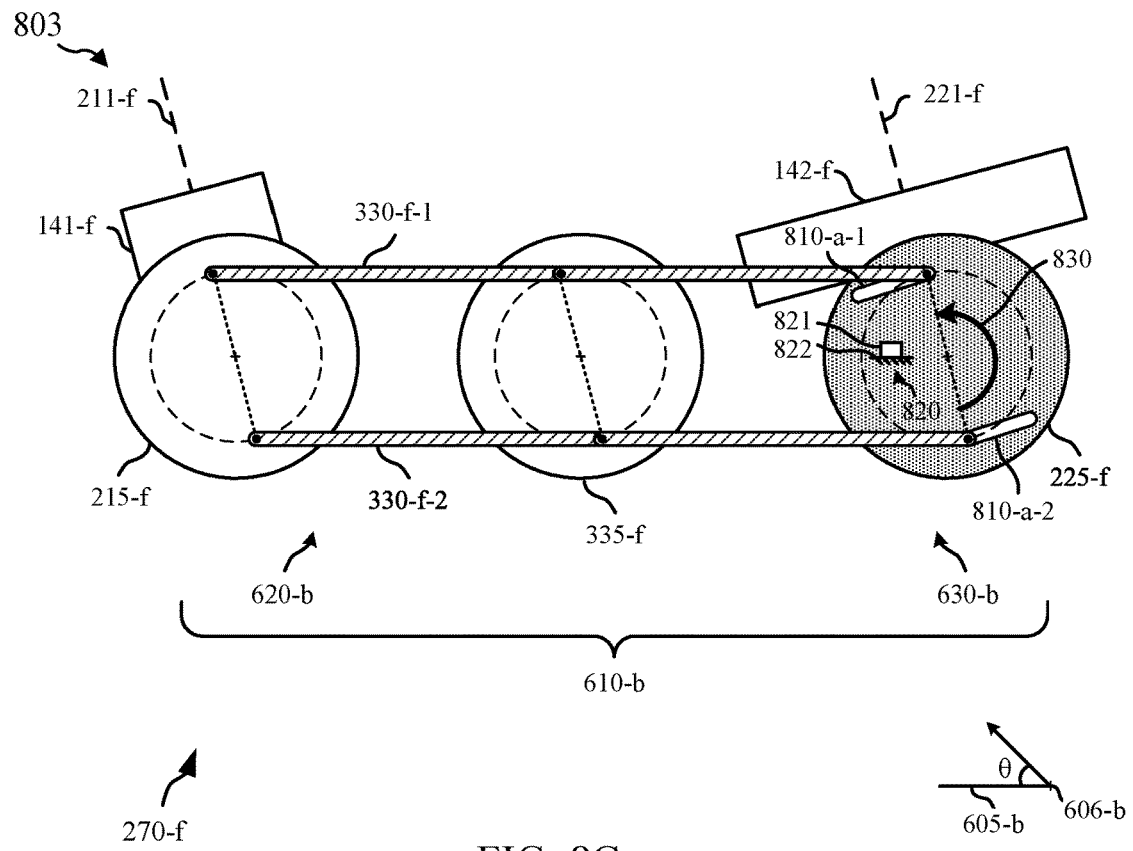

FIG. 8C illustrates a schematic view of a third state 803 of the multiple-antenna positioner 270-*f*. The third state 803 may correspond to a condition where the first spindle 215-*f* is at a minimum angle, and the second spindle 225-*f* and the third spindle 335-*f* are at an intermediate angle (e.g., between minimum and maximum elevation angles). For example, the third spindle 335-*f* may be actuated to an angle 619 (e.g., $\theta_{Dd}$) described with reference to FIG. 6, which may correspond to the first spindle 215-*f* being oriented at an angle 629 (e.g., $\theta_{1d}$) and the second spindle 225-*f* being oriented at an angle 636 (e.g., $\theta_{2a}$). At the third state 803, the first feature 821 and the second feature 822 of a travel stop 820 may become engaged or coupled, and the spring element 830 may transition from providing a preload of the link arms 330-*f*-3 and 330-*f*-4 to providing a preload between the first feature 821 and the second feature 822 of the travel stop 820. Between the first state 801 and second state 802 the link arms 330-*f*-3 and 330-*f*-4 may behave as relatively rigidly coupled with the second spindle 225-*f*, supporting a 1:1 actuation ratio between the third spindle 335-*f* and the second spindle 225-*f* over such an actuation range. In some examples, through actuation between the second state 802 and the third state 803, the orientation (e.g., elevation orientation) of the boresight 211-*f* may be equal to or substantially equal to the orientation of the boresight 221-*f*, which may support a dynamic selection between the first antenna 141-*f* and the second antenna 142-*f* for communications (e.g., according to a particular antenna or beam characteristic). The third state 803 may illustrate a boundary of orienting the second spindle 225-*d* (e.g., corresponding to the travel stop 820 of the second spindle 225-*d*, corresponding to travel stop of the slot 810-*a*-1, corresponding to an travel stop of the slot 810-*a*-2).

Figure 8D:
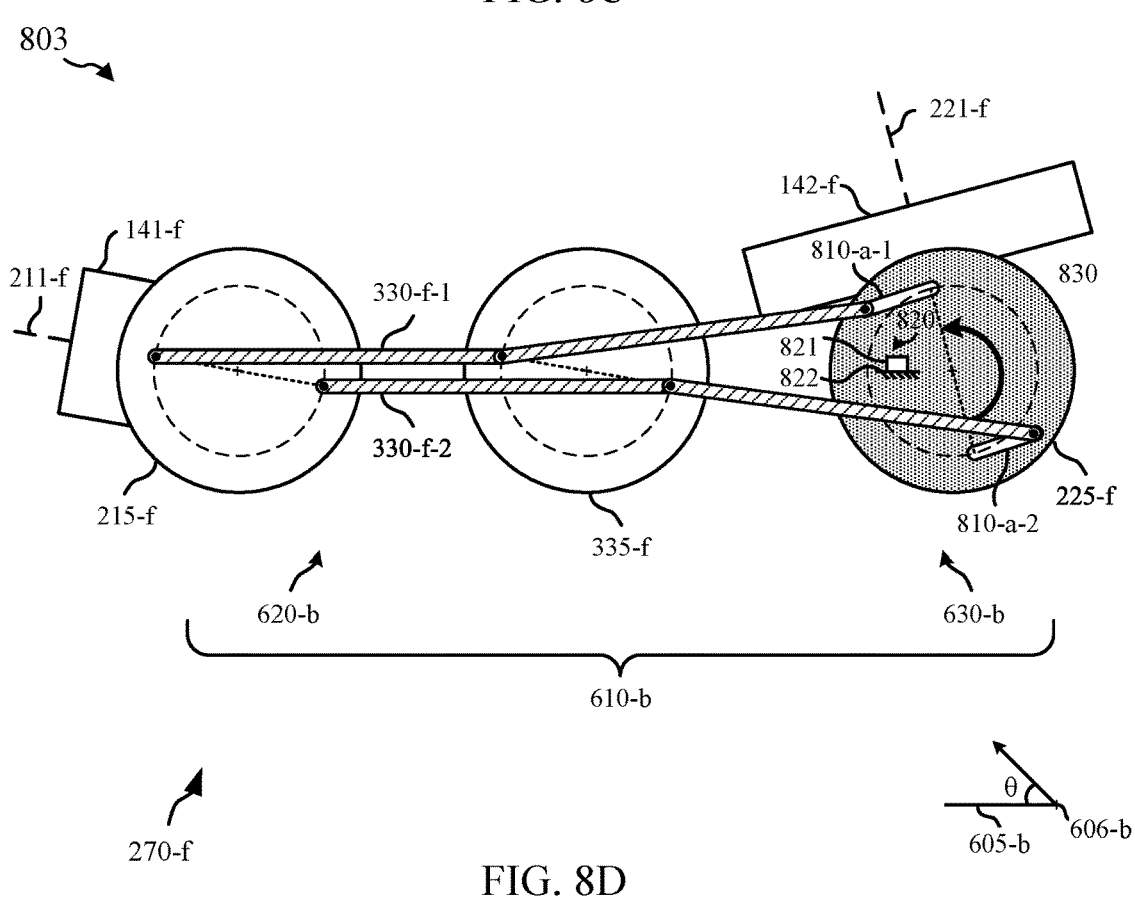

FIG. 8D illustrates a schematic view of a fourth state 804 of the multiple-antenna positioner 270-*f*. The fourth state 804 may correspond to a condition where the first spindle 215-*f*, the second spindle 225-*f*, and the third spindle 335-*f* are each at a minimum angle (e.g., a minimum elevation angle). For example, the third spindle 335-*f* may be actuated to an angle 616 (e.g., $\theta_{Da}$) described with reference to FIG. 6, which may correspond to the first spindle 215-*f* being oriented at an angle 626 (e.g., $\theta_{1a}$) and the second spindle 225-*f* remaining oriented at an angle 636 (e.g., $\theta_{2a}$). At the fourth state 804, the first feature 821 and the second feature 822 of a travel stop 820 may remain engaged or coupled, and the spring element 830 may continue to provide a preload between the first feature 821 and the second feature 822 of the travel stop 820. Between the second state 802 and the third state 803 the ends of the link arms 330-*f*-3 and 330-*f*-4 may move relatively within the slot 810-*a*-1 and 810-*a*-2, respectively. Thus, an actuation range between the third state 803 and the fourth state 804 may represent a range of non-overlap of the positioning range of the first antenna 141-*f* and the second antenna 142-*f*.

In some examples, at the fourth state 804, ends of one or both of the link arms 330-*f*-3 or 330-*f*-4 may engage with and end or travel stop of the slot 810-*a*-1 and 810-*a*-2, respectively, which may suppress further rotation of the third spindle 335-*f* or the first spindle 215-*f*. In some examples, through actuation between the third state 803 and the fourth state 804, the orientation (e.g., elevation orientation) of the boresight 211-*f* may change while the orientation of the boresight 221-*f* is maintained. By suppressing rotation of the second antenna 142-*f* between the third state 803 and the fourth state 804 (e.g., mechanically idling the second spindle 225-*f* while actuating the third spindle 335-*f*), a physical envelope for positioning the second antenna 142-*f* may be reduced, supporting a relatively smaller radome or other packaging constraint associated with the relatively larger aperture of the second antenna 142-*f*, while also supporting the first antenna 141-*f* and the second antenna 142-*f* being positioned with a common drive element 440.

Figure 9:
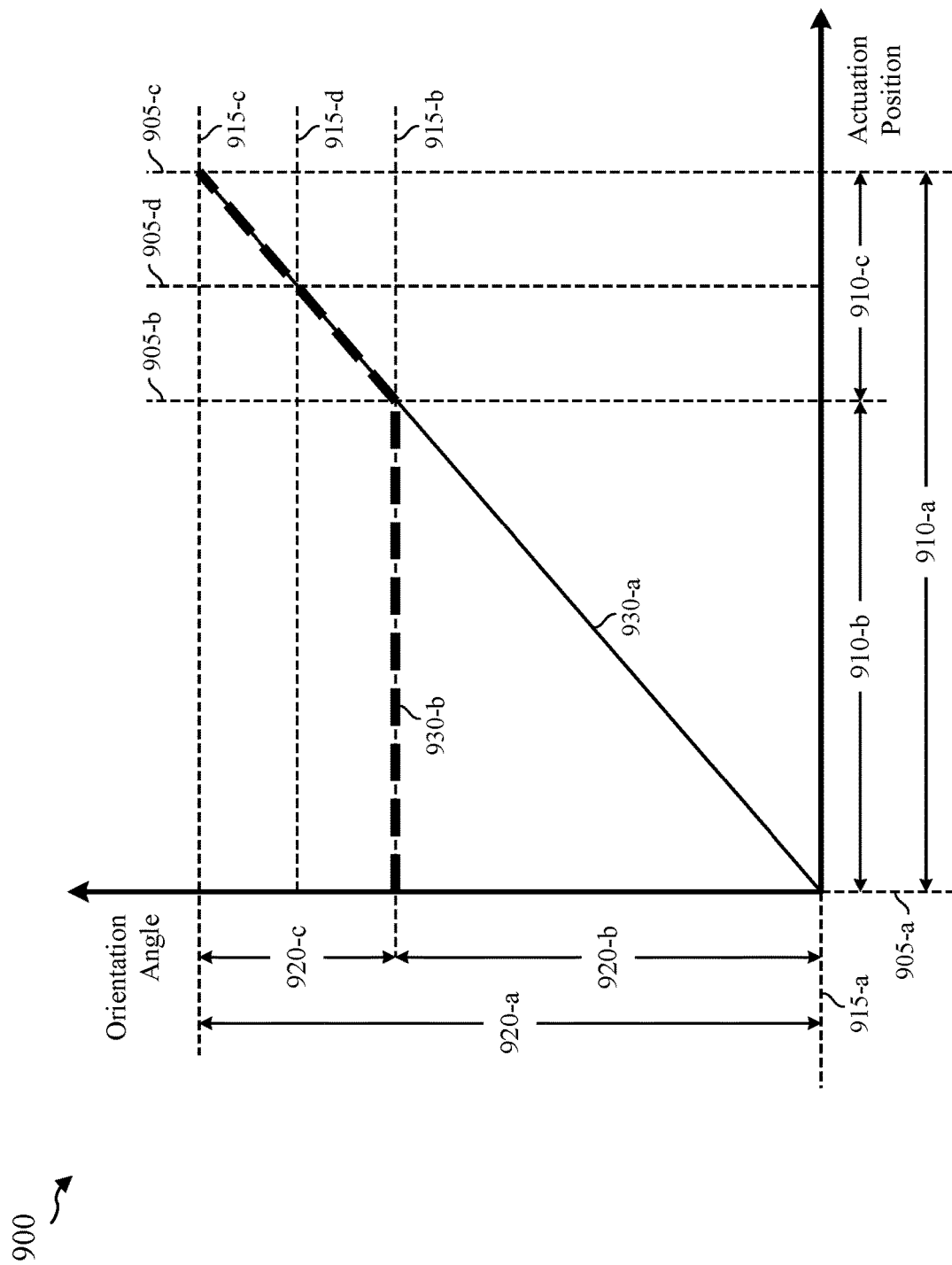
FIG. 9 shows an actuation relationship for communication via a multiple antenna system accordance with aspects of the present disclosure.

FIG. 9 shows an actuation relationship 900 for communication via a multiple antenna system accordance with aspects of the present disclosure. The actuation relationship 900 illustrates an example of orientation angles 915 versus actuation positions 905 that may be supported by a multiple-antenna positioner 270. For example, the actuation relationship 900 includes a first orientation profile 930-*a*, which may illustrate an example of orientation angles 915 for a first antenna 141 or a boresight 211 of a first antenna 141 versus actuation positions 905 (e.g., associated with a linkage 620). The actuation relationship 900 also includes a second orientation profile 930-*b*, which may illustrate an example of orientation angles 915 for a second antenna 142 or a boresight 221 of a second antenna 142 versus actuation positions 905 (e.g., associated with a linkage 630).

The orientation angles 915 may refer to angles about a positioning degree of freedom (e.g., an angle relative to a reference plane 605, an angle about a positioning axis 606, an angle relative to a horizontal plane or nominally horizontal plane, an angle about an elevation axis, an elevation angle). The actuation positions 905 may refer to a position of an actuator that is common to the first antenna 141 and the second antenna 142, and may refer to an angle (e.g., associated with a rotational drive element 440 or a spindle 335) or a linear displacement (e.g., associated with a linear drive element 440 or a position of an intervening linkage), or other actuation associated with driving a mechanism 610 (e.g., a linkage 620 and a linkage 630).

In some examples, the actuation relationship 900 may illustrate relationships of the multiple-antenna positioner 270-*d* described with reference to FIG. 6. For example, an actuation position 905-*a* may correspond to an angle 616, an actuation position 905-*b* may correspond to an angle 619, an actuation position 905-*c* may correspond to an angle 618, and an actuation position 905-*d* may correspond to an angle 617. An orientation angle 915-*a* may correspond to an angle 626, an orientation angle 915-*b* may correspond to an angle 629 and an angle 636, an orientation angle 915-*c* may correspond to an angle 628 and an angle 638, and an orientation angle 915-*d* may correspond to an angle 627 and an angle 637. Although the actuation relationship 900 may illustrate some examples of a multiple-antenna positioner 270, the actuation relationship 900 is not limiting of the possible configurations of a multiple-antenna positioner 270, or correspondence between various actuation positions 905 and orientation angles 915 that may be supported by a multiple-antenna positioner 270, in accordance with the present disclosure.

The actuation relationship 900 illustrates various relationships between actuation ranges 910 and orientation ranges 920 that may be supported by a multiple-antenna positioner 270 in accordance with examples as disclosed herein. For example, over a total actuation range 910-*a*, a mechanism 610 or a linkage 620 associated with the orientation profile 930-*a* may be configured to position a first antenna 141 or a boresight 211 over a first orientation range 920-*a* (e.g., a total orientation range). Over the same actuation range 910-*a*, the mechanism 610 or a linkage 630 associated with the orientation profile 930-*b* may be configured to position a second antenna 142 or a boresight 221 over an orientation range 920-*c* (e.g., a partial orientation range, a portion of a total orientation range) that is different than the orientation range 920-*a*. As illustrated, the orientation range 920-*a* and the orientation range 920-*c* may be overlapping.

Over the orientation range 920-*c*, both the first antenna 141 and the second antenna 142 may be positioned by the common actuation, and either the antenna 141 or the antenna 142 may be selected for communications. In the illustrated example, over the actuation range 910-*c*, the orientation angles 915 of the first antenna 141 or boresight 211 may be common with or equal to the orientation angles 915 of the second antenna 142 or boresight 221, such that they are aligned with a common target at one or more actuation positions 905. By supporting common orientation angles 915 at one or more actuation positions 905 over the orientation range 920-*c* or the actuation range 910-*c*, handover between the antenna 141 and the antenna 142 may be performed without a repositioning latency. In some examples, an orientation angle 915-*d* (e.g., an orientation angle 915 within the orientation range 920-*c*) may correspond to an overhead position, such that a relatively rapid handover without antenna repositioning may be performed in a keyhole condition. In the illustrated example, over the actuation range 910-*b*, the orientation angles 915 of the first antenna 141 or boresight 211 may be different than the orientation angles 915 of the second antenna 142 or boresight 221.

The actuation relationship 900 also illustrates that, over the actuation range 910-*b*, the second antenna 142 may be mechanically idled, such that the orientation angle 915 of the orientation profile 930-*b* is fixed or maintained over the actuation range 910-*b* (e.g., at the orientation angle 915-*b*). In some examples, limiting the orientation angle 915 of the orientation profile 930-*b* may limit a spatial envelope required to actuate or enclose a second antenna 142, such as enclosing the second antenna 142 in a same radome as a first antenna 141, which may support the second antenna 142 having a larger aperture dimension (e.g., than the first antenna 141).

Figure 10:
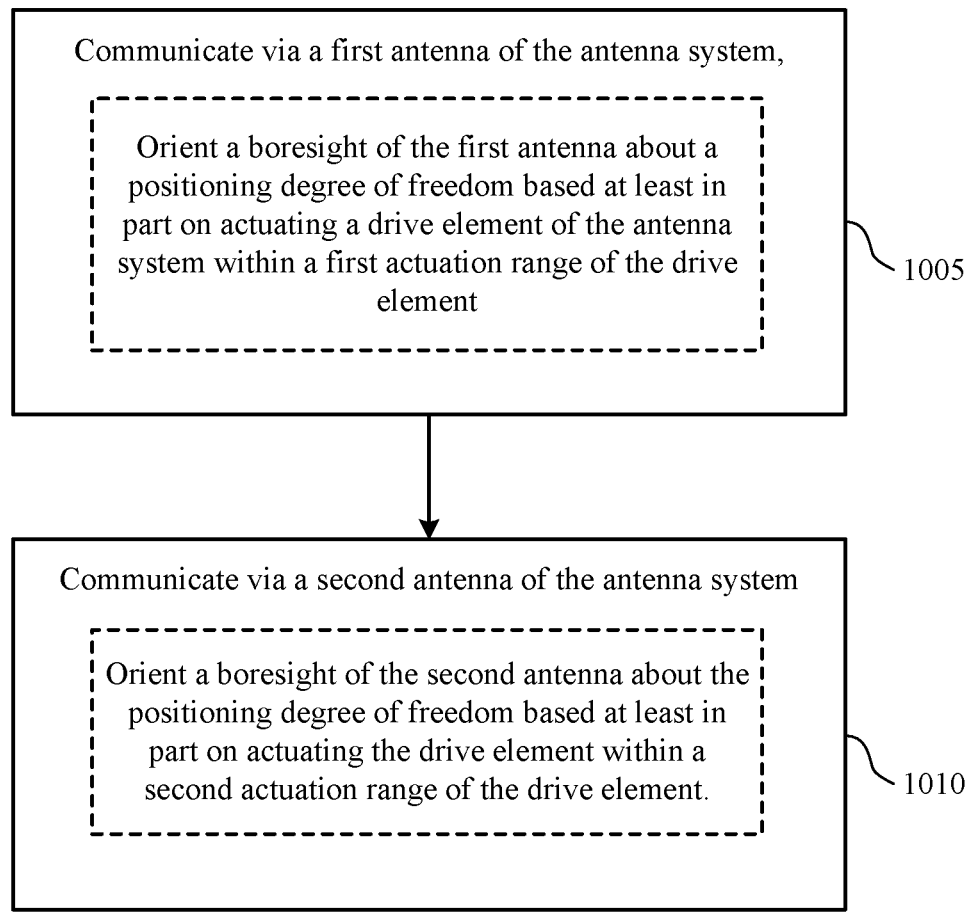
FIG. 10 shows a flowchart illustrating a method for communication via a multiple antenna system accordance with aspects of the present disclosure.

FIG. 10 shows a flowchart illustrating a method 1000 for communication via a multiple antenna system accordance with aspects of the present disclosure. The operations of method 1000 may be implemented by a multiple antenna system 140 or its components as described herein (e.g., a multiple-antenna positioner 270) described with reference to FIGS. 1 through 9. In some examples, a multiple antenna system 140 (e.g., an antenna control unit 275) may execute a set of instructions to control the functional elements of the device to perform the described functions. Additionally or alternatively, a multiple antenna system 140 may perform aspects of the described functions using special-purpose hardware.

At 1005, the method 1000 may include communicating via a first antenna of the multiple antenna system. Communicating via the first antenna may include orienting a boresight of the first antenna about a positioning degree of freedom based at least in part on actuating a drive element of the antenna system within a first actuation range of the drive element. In some examples, orienting the boresight of the first antenna may include orienting the boresight of the first antenna in an elevation orientation. In some examples, driving the first antenna may be based at least in part on a first actuation ratio between the drive element and an orientation of the boresight of the first antenna about the positioning degree of freedom.

Some examples of the method 1000 may further include determining to perform the communicating via the first antenna of the antenna system based on an orientation of the boresight of the first antenna about the positioning degree of freedom, or on an orientation of the boresight of a second antenna about the positioning degree of freedom, or both. In some examples, such an orientation may be associated with an orientation of a target device according to the positioning degree of freedom. For example, determining to perform the communications via the first antenna may be based on a desired boresight orientation being within a positioning range of the first antenna or being outside a positioning range of the second antenna. In some examples, the multiple antenna system 140 may determine to perform communications using the first antenna based on a beam characteristic of the first antenna (e.g., a beam width, a transmission or reception gain or gain profile).

At 1010, the method may include communicating via a second antenna of the antenna system. Communicating via the second antenna may include orienting a boresight of the second antenna about the positioning degree of freedom based at least in part on actuating the drive element within a second actuation range of the drive element. In some examples, for at least a portion of the second actuation range, the boresight of the first antenna does not change orientation in response to the actuating the drive element. In some examples, the second actuation range may be greater than the first actuation range. In some examples, orienting the boresight of the second antenna includes orienting the boresight of the second antenna in an elevation orientation.

In some examples, driving the second antenna may be based at least in part on a second actuation ratio, equal to the first actuation ratio, between the drive element and an orientation of the boresight of the second antenna about the positioning degree of freedom. In some examples, having a common actuation ratio may facilitate having a common orientation of the first antenna and the second antenna (e.g., over a range of positioning overlap), or having controller gains or logic that are common to communication operations when using the first antenna or the second antenna.

In some examples, driving the second antenna may be based at least in part on a second actuation ratio, different than the first actuation ratio, between the drive element and an orientation of the boresight of the second antenna about the positioning degree of freedom. In some examples, having different actuation ratios may support using rigid couplings, or using couplings that otherwise lack a discontinuous actuation of a respective antenna in response to actuating the drive element, when driving the first antenna and the second antenna through different orientation ranges.

In some examples of the method 1000, actuating the drive element within the second actuation range of the drive element may include driving a linkage between the drive element and the first antenna that is configured to suppress movement of the first antenna over the second actuation range of the drive element (e.g., according to an idled position the first antenna).

In some examples of the method 1000, driving the linkage between the drive element and the first antenna may include driving a linear bearing having a travel stop corresponding to a boundary of the second actuation range of the drive element (e.g., where the suppression of movement may be supported by a preloading into a different travel stop of the linkage, which may relieve a preloading of the travel stop of the linear bearing).

In some examples of the method 1000, driving the linkage between the drive element and the first antenna may include driving a link arm, coupled with the drive element, within a slot of a spindle coupled with the second antenna, where the slot has an end corresponding to a boundary of the second actuation range of the drive element (e.g., where the suppression of movement may be supported by a preloading into a different travel stop, which may relieve a preloading of the end of the slot).

Some examples of the method 1000 may further include determining to perform the communicating via the second antenna of the antenna system based at least in part on an orientation of the boresight of the first antenna about the positioning degree of freedom, or on an orientation of the boresight of the second antenna about the positioning degree of freedom, or both. In some examples, such an orientation may be associated with an orientation of a target device according to the positioning degree of freedom. For example, the multiple antenna system 140 may select to perform communications using the second antenna based on a desired boresight orientation being within a positioning range of the second antenna or outside a positioning range of the first antenna. In some examples, the multiple antenna system 140 may select to perform communications using the second antenna based on a beam characteristic of the second antenna (e.g., a beam width, a gain or gain profile)

Some examples of the method 1000 may further include determining to transition between communicating via the first antenna and communicating via the second antenna based at least in part on one or both of: (1) a first aperture dimension of the first antenna, measured along a direction perpendicular to the boresight of the first antenna and perpendicular to an axis of the positioning degree of freedom or (2) a second aperture dimension of the first antenna, measured along a direction perpendicular to the boresight of the second antenna and perpendicular to the axis of the positioning degree of freedom. For example, the first antenna or the second antenna may be selected based on a desired beam characteristic, such as selecting the antenna having a wider or narrower aperture, a wider or narrower beam width, a wider or narrower positioning tolerance for maintaining a communication link, or other antenna characteristics. Some examples of the method 1000 may further include determining to transition between communicating via the first antenna and communicating via the second antenna based at least in part on one or both of a gain of the first antenna or a gain of the second antenna.

In one example of a selection between the first antenna and the second antenna, the multiple antenna system 140 may identify a "keyhole" condition, such as when a target device is directly overhead the multiple antenna system 140 (e.g., at or near a 90 degree elevation). In such examples, to track the target device, the multiple antenna system 140 may need to rapidly position a multiple-antenna positioner 270 in a keyhole condition, such as rapidly actuating or dithering about an azimuth axis. Due to azimuth actuation limitations (e.g., related to a maximum supported azimuth rate), the multiple antenna system 140 may have difficulty tracking a target device under such conditions with a relatively narrow beam. Thus, although it may be preferable to maintain a communication link using a relatively narrow, high-gain beam in some circumstances, to support a longer transition through a keyhole condition (e.g., support a longer duration for performing a relatively large azimuth actuation), the multiple antenna system may determine to switch to communicating using an antenna with a broader beam that is less sensitive to positioning error or inaccuracy. After passing such a keyhole condition, the multiple antenna system 140 may determine to switch back to an antenna associated with a relatively narrower beam, when such an antenna would be oriented within a positioning range of the antenna to establish a communication link with a target device. In some examples, when a first antenna and a second antenna are generally oriented in the same direction, the described techniques may include a make-before-break transition where a communication link is established with a newly selected antenna before breaking a connection with a previously servicing antenna. Such techniques may include a transition of modem traffic at an antenna control unit 275 from one antenna to another.

An antenna assembly is described. The antenna assembly may include a first antenna having a first boresight, a second antenna having a second boresight, and a drive element. The antenna assembly may also include a mechanism coupled with the drive element that is configured to, in response to the drive element driving over an actuation range, position the first boresight over a first orientation range about a positioning degree of freedom, and position the second boresight over a second orientation range about the positioning degree of freedom that is different than the first orientation range. In some examples of the antenna assembly, the first orientation range may be greater than the second orientation range. In some examples, the positioning degree of freedom may correspond to an elevation angle of boresight positioning.

In some examples of the antenna assembly, the mechanism may include a first linkage (e.g., between the drive element and the first antenna) that is configured to position the first antenna over the actuation range in response to the drive element driving over the actuation range. In some examples of the antenna assembly, the mechanism may include a second linkage (e.g., between the drive element and the second antenna) that is configured to drive the second antenna over a first portion of the actuation range and suppress movement of the second antenna over a second portion of the actuation range. In some examples, the first linkage may include a rigid link arm coupling the drive element with the first antenna.

In some examples of the antenna assembly, a second linkage of the mechanism may include a linear bearing having a travel stop (e.g., an antenna travel stop) corresponding to a boundary of the second portion of the actuation range. In some examples, the second linkage may include another linear bearing having a second travel stop corresponding to a second boundary of the second orientation range.

In some examples of the antenna assembly, a second linkage of the mechanism may include a rigid link arm coupled with the drive element, and a spindle coupled with the second antenna. The rigid link arm may be coupled with a slot of the spindle (e.g., via a pin or other interface with the slot), the slot having an end corresponding to a boundary of the second portion of the actuation range.

In some examples of the antenna assembly, at least a portion of the second orientation range overlaps at least a portion of the first orientation range (e.g., an overlap range where the first antenna or the second antenna may be positioned by the drive element at a respective orientation). In some examples, at a boundary of the second orientation range, the orientation of the first boresight about the positioning degree of freedom may be equal to the orientation of the second boresight about the positioning degree of freedom (e.g., to facilitate handover of communications from one antenna to another). In some examples of the antenna assembly, through a range of overlap between the first orientation range and the second orientation range, the orientation of the first boresight about the positioning degree of freedom may be equal to the orientation of the second boresight about the positioning degree of freedom (e.g., to support a dynamic selection of the first antenna or the second antenna for communications when a target device is positioned within the range of overlap).

In some examples of the antenna assembly, at least a portion of the first orientation range does not overlap the second orientation range. In some examples, through a range of non-overlap between the first orientation range and the second orientation range, the orientation of the first boresight about the positioning degree of freedom may be different than the orientation of the second boresight about the positioning degree of freedom. In some examples, the mechanism may include a travel stop configured for maintaining a position of the second antenna through actuation of the drive element associated with a range of non-overlap between the first orientation range and the second orientation range (e.g., to limit a physical envelope associated with actuating the second antenna, to limit a size of a radome used to enclose the antenna assembly).

In some examples of the antenna assembly, the first antenna may be associated with a first aperture dimension (e.g., width), measured along a direction perpendicular to the first boresight and perpendicular to an axis of the positioning degree of freedom, and the second antenna may be associated with a second aperture dimension, measured along a direction perpendicular to the second boresight and perpendicular to the axis of the positioning degree of freedom, that is greater than the first aperture dimension.

In some examples of the antenna assembly, the mechanism may be configured for a first actuation ratio between the drive element and the orientation of the first boresight about the positioning degree of freedom, and a second actuation ratio, equal to the first actuation ratio, between the drive element and the orientation of the second boresight about the positioning degree of freedom. In some examples, having a common actuation ratio may facilitate having a common orientation of the first antenna and the second antenna (e.g., over a range of positioning overlap), or having controller gains or logic that are common to communication operations when using the first antenna or the second antenna.

In some examples of the antenna assembly, the mechanism may be configured for a first actuation ratio between the drive element and the orientation of the first boresight about the positioning degree of freedom, and a second actuation ratio, different than to the first actuation ratio, between the drive element and the orientation of the second boresight about the positioning degree of freedom. In some examples, having different actuation ratios may support using rigid couplings, or using couplings that otherwise lack a discontinuous actuation of a respective antenna in response to actuating the drive element, when driving the first antenna and the second antenna through different orientation ranges.

Although certain aspects are described in the context of an antenna boresight orientation, the techniques described herein may be applied with an antenna having a variable boresight, such as an electronically-steerable boresight (e.g., by way of beamforming). Thus, in some examples, aspects described in the context of a boresight orientation may be further applicable to a nominal or physical orientation of such an antenna, upon which a beamforming operation may further cause the antenna system to electronically steer a boresight of the respective antenna.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The foregoing description and claims may refer to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled with another element/feature. Thus, although the various schematics shown in the Figures depict example arrangements of elements and components, additional intervening elements, devices, features, or components may be present in an actual embodiment (assuming that the functionality of the depicted circuits is not adversely affected).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims.

Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. An antenna assembly, comprising:
   a first antenna having a first boresight;
   a second antenna having a second boresight;
   a drive element; and
   a mechanism coupled with the drive element and configured to, in response to the drive element driving over an actuation range:
      position the first boresight over a first orientation range about a positioning degree of freedom; and
      position the second boresight over a second orientation range about the positioning degree of freedom that is different than the first orientation range.

2. The antenna assembly of claim 1, wherein the mechanism comprises:
   a first linkage between the drive element and the first antenna that is configured to position the first antenna over the actuation range in response to the drive element driving over the actuation range; and
   a second linkage between the drive element and the second antenna that is configured to drive the second antenna over a first portion of the actuation range and suppress movement of the second antenna over a second portion of the actuation range.

3. The antenna assembly of claim 2, wherein the first linkage comprises a rigid link arm coupling the drive element with the first antenna.

4. The antenna assembly of claim 2, wherein the second linkage comprises a linear bearing having an antenna travel stop corresponding to a boundary of the second portion of the actuation range.

5. The antenna assembly of claim 4, wherein the linear bearing is a first linear bearing and the boundary is a first boundary, and wherein the second linkage comprises a second linear bearing having a second travel stop corresponding to a second boundary of the second orientation range.

6. The antenna assembly of claim 2, wherein the second linkage comprises:
   a rigid link arm coupled with the drive element; and
   a spindle coupled with the second antenna, wherein the rigid link arm is coupled with a slot of the spindle having an end corresponding to a boundary of the second portion of the actuation range.

7. The antenna assembly of claim 1, wherein the first orientation range is greater than the second orientation range.

8. The antenna assembly of claim 1, wherein at least a portion of the second orientation range overlaps at least a portion of the first orientation range.

9. The antenna assembly of claim 8, wherein, at a boundary of the second orientation range, the orientation of the first boresight about the positioning degree of freedom is equal to the orientation of the second boresight about the positioning degree of freedom.

10. The antenna assembly of claim 8, wherein, through a range of overlap between the first orientation range and the second orientation range, the orientation of the first boresight about the positioning degree of freedom is equal to the orientation of the second boresight about the positioning degree of freedom.

11. The antenna assembly of claim 1, wherein at least a portion of the first orientation range does not overlap the second orientation range.

12. The antenna assembly of claim 11, wherein, through a range of non-overlap between the first orientation range and the second orientation range, the orientation of the first boresight about the positioning degree of freedom is different than the orientation of the second boresight about the positioning degree of freedom.

13. The antenna assembly of claim 11, wherein the mechanism comprises:
   a travel stop configured for maintaining a position of the second antenna through actuation of the drive element associated with a range of non-overlap between the first orientation range and the second orientation range.

14. The antenna assembly of claim 1, wherein:
   the first antenna is associated with a first aperture dimension, measured along a direction perpendicular to the first boresight and perpendicular to an axis of the positioning degree of freedom; and
   the second antenna is associated with a second aperture dimension, measured along a direction perpendicular to the second boresight and perpendicular to the axis of the positioning degree of freedom, that is greater than the first aperture dimension.

15. The antenna assembly of claim 1, wherein the mechanism is configured for:
   a first actuation ratio between the drive element and the orientation of the first boresight about the positioning degree of freedom; and
   a second actuation ratio, equal to the first actuation ratio, between the drive element and the orientation of the second boresight about the positioning degree of freedom.

16. The antenna assembly of claim 1, wherein the mechanism is configured for:
   a first actuation ratio between the drive element and the orientation of the first boresight about the positioning degree of freedom; and
   a second actuation ratio, different than to the first actuation ratio, between the drive element and the orientation of the second boresight about the positioning degree of freedom.

17. The antenna assembly of claim 1, wherein the positioning degree of freedom corresponds to an elevation angle of boresight positioning.

18. A method of communication via an antenna system, the method comprising:
   communicating via a first antenna of the antenna system, wherein the communicating via the first antenna comprises orienting a boresight of the first antenna about a positioning degree of freedom based at least in part on actuating a drive element of the antenna system within a first actuation range of the drive element; and communicating via a second antenna of the antenna system, wherein the communicating via the second antenna comprises orienting a boresight of the second antenna about the positioning degree of freedom based at least in part on actuating the drive element within a second actuation range of the drive element, wherein, for a portion of the second actuation range, the boresight of the first antenna does not change orientation in response to the actuating the drive element.

19. The method of claim 18, wherein actuating the drive element within the second actuation range of the drive element comprises:

driving a linkage between the drive element and the first antenna that is configured to suppress movement of the first antenna over the second actuation range of the drive element.

20. The method of claim 19, wherein driving the linkage between the drive element and the first antenna comprises:

driving a linear bearing having a travel stop corresponding to a boundary of the second actuation range of the drive element.

21. The method of claim 19, wherein driving the linkage between the drive element and the first antenna comprises:

driving a link arm, coupled with the drive element, within a slot of a spindle coupled with the second antenna, wherein the slot has an end corresponding to a boundary of the second actuation range of the drive element.

22. The method of claim 18, wherein the second actuation range is greater than the first actuation range.

23. The method of claim 18, further comprising:

determining to perform the communicating via the first antenna of the antenna system based at least in part on an orientation of the boresight of the first antenna about the positioning degree of freedom, or on an orientation of the boresight of the second antenna about the positioning degree of freedom, or both.

24. The method of claim 18, further comprising:

determining to perform the communicating via the second antenna of the antenna system based at least in part on an orientation of the boresight of the first antenna about the positioning degree of freedom, or on an orientation of the boresight of the second antenna about the positioning degree of freedom, or both.

25. The method of claim 18, further comprising:

determining to transition between communicating via the first antenna and communicating via the second antenna based at least in part on one or both of:

a first aperture dimension of the first antenna, measured along a direction perpendicular to the boresight of the first antenna and perpendicular to an axis of the positioning degree of freedom; or a second aperture dimension of the first antenna, measured along a direction perpendicular to the boresight of the second antenna and perpendicular to the axis of the positioning degree of freedom.

26. The method of claim 18, further comprising:

determining to transition between communicating via the first antenna and communicating via the second antenna based at least in part on one or both of a gain of the first antenna or a gain of the second antenna.

27. The method of claim 18, wherein:

driving the first antenna is based at least in part on a first actuation ratio between the drive element and an orientation of the boresight of the first antenna about the positioning degree of freedom; and driving the second antenna is based at least in part on a second actuation ratio, equal to the first actuation ratio, between the drive element and an orientation of the boresight of the second antenna about the positioning degree of freedom.

28. The method of claim 18, wherein:

driving the first antenna is based at least in part on a first actuation ratio between the drive element and an orientation of the boresight of the first antenna about the positioning degree of freedom; and driving the second antenna is based at least in part on a second actuation ratio, different than the first actuation ratio, between the drive element and an orientation of the boresight of the second antenna about the positioning degree of freedom.

29. The method of claim 18, wherein:

orienting the boresight of the first antenna comprises orienting the boresight of the first antenna in an elevation orientation; and orienting the boresight of the second antenna comprises orienting the boresight of the second antenna in an elevation orientation.

* * * * *